United States Patent
Schofield et al.

(10) Patent No.: US 8,643,724 B2
(45) Date of Patent: Feb. 4, 2014

(54) MULTI-CAMERA VISION SYSTEM FOR A VEHICLE

(71) Applicant: Donnelly Corporation, Holland, MI (US)

(72) Inventors: Kenneth Schofield, Holland, MI (US); Mark L. Larson, Grand Haven, MI (US); Keith J. Vadas, Coopersville, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 13/800,691

(22) Filed: Mar. 13, 2013

(65) Prior Publication Data

US 2013/0194426 A1 Aug. 1, 2013

Related U.S. Application Data

(63) Continuation of application No. 12/688,146, filed on Jan. 15, 2010, which is a continuation of application No. 12/496,357, filed on Jul. 1, 2009, now Pat. No. 8,462,204, which is a continuation of application No. 11/122,880, filed on May 5, 2005, now Pat. No. 7,561,181, which is a continuation of application No. 10/324,679, filed on Dec. 20, 2002, now Pat. No. 6,891,563, which is a continuation of application No. 08/952,026, filed as application No. PCT/US96/07382 on May 22, 1996, now Pat. No. 6,498,620.

(51) Int. Cl.
   *H04N 7/18* (2006.01)
(52) U.S. Cl.
   USPC .............................. 348/148; 348/113; 348/115
(58) Field of Classification Search
   USPC .......................................... 348/111–115, 148
   See application file for complete search history.

(56) References Cited

U.S. PATENT DOCUMENTS 3,985,424 A   10/1976   Steinacher
4,200,361 A   4/1980   Malvano
(Continued)

FOREIGN PATENT DOCUMENTS

DE   3248511   7/1984
DE   4107965   9/1991
(Continued)

OTHER PUBLICATIONS

G. Wang, D. Renshaw, P.B. Denyer and M. Lu, CMOS Video Cameras, article, 1991, 4 pages, University of Edinburgh, UK.
(Continued)

*Primary Examiner* — Andy Rao
(74) *Attorney, Agent, or Firm* — Gardner, Linn, Burkhart & Flory, LLP

(57) ABSTRACT

A multi-camera vision system for a vehicle includes first, second and third image capture devices disposed at respective vehicle portions. The first image capture device field of view overlaps with the third image capture device field of view defining a first overlap zone, and the second image capture device field of view overlaps with the third image capture device field of view defining a second overlap zone. Responsive to processing by an image processor of received image data, a synthesized image is generated without duplication of objects present in the first overlap zone and in the second overlap zone. The synthesized image approximates a view as would be seen by a virtual camera at a single location exterior of the vehicle, and is displayed by a single display screen of a reconfigurable display device that is viewable by a driver of the vehicle when normally operating the vehicle.

86 Claims, 13 Drawing Sheets

(56) References Cited

U.S. PATENT DOCUMENTS

| | | |
|---|---|---|
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,859,031 A | 8/1989 | Berman et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,900,133 A | 2/1990 | Berman |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,214,408 A | 5/1993 | Asayama |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |

(56) References Cited

U.S. PATENT DOCUMENTS

| | | |
|---|---|---|
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |

(56) References Cited

U.S. PATENT DOCUMENTS

| | | |
|---|---|---|
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 | 2/2011 | Camilleri et al. |
| 7,914,187 B2 | 3/2011 | Higgins-Luthman et al. |
| 7,930,160 B1 | 4/2011 | Hosagrahara et al. |
| 8,017,898 B2 | 9/2011 | Lu et al. |
| 8,095,310 B2 | 1/2012 | Taylor et al. |
| 8,098,142 B2 | 1/2012 | Schofield et al. |
| 8,224,031 B2 | 7/2012 | Saito |
| 2002/0113873 A1 | 8/2002 | Williams |
| 2003/0137586 A1 | 7/2003 | Lewellen |
| 2003/0222982 A1 | 12/2003 | Hamdan et al. |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0242339 A1 | 10/2007 | Bradley |
| 2008/0147321 A1 | 6/2008 | Howard et al. |
| 2008/0192132 A1 | 8/2008 | Bechtel et al. |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2012/0045112 A1 | 2/2012 | Lundblad et al. |

FOREIGN PATENT DOCUMENTS

| | | |
|---|---|---|
| EP | 0202460 | 11/1986 |
| EP | 0830267 | 3/1988 |
| EP | 0426503 | 5/1991 |
| EP | 0450553 | 10/1991 |
| EP | 0492591 | 7/1992 |
| EP | 0513476 | 11/1992 |
| EP | 0605045 | 7/1994 |
| EP | 0788947 | 8/1997 |
| JP | S5539843 | 3/1980 |
| JP | S58110334 | 6/1983 |
| JP | 59114139 | 7/1984 |
| JP | 6079889 | 5/1985 |
| JP | 6080953 | 5/1985 |
| JP | 6272245 | 5/1987 |
| JP | 6414700 | 1/1989 |
| JP | 01123587 | 5/1989 |

(56) References Cited

FOREIGN PATENT DOCUMENTS

| | | |
|---|---|---|
| JP | 03099952 | 4/1991 |
| JP | 04239400 | 11/1991 |
| JP | 04114587 | 4/1992 |
| JP | 0577657 | 3/1993 |
| JP | 05050883 | 3/1993 |
| JP | 05213113 | 8/1993 |
| JP | 06107035 | 4/1994 |
| JP | 6227318 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 2630604 | 7/1997 |
| JP | 2003-083742 | 3/2003 |
| WO | WO9621581 | 7/1996 |

OTHER PUBLICATIONS

Tokimaru et al., "CMOS Rear-View TV System with CCD Camera", National Technical Report vol. 34, No. 3, pp. 329-336, Jun. 1988 (Japan).

Reexamination Control No. 90/007,519, dated Jun. 9, 2005, Reexamination of U.S. Patent No. 6,222,447, issued to Schofield et al.

Reexamination Control No. 90/007,520, dated Jun. 9, 2005, Reexamination of U.S. Patent No. 5,949,331, issued to Schofield et al.

Reexamination Control No. 90/011,478, dated Mar. 28, 2011, Reexamination of U.S. Patent No. 6,222,447, issued to Schofield et al.

Reexamination Control No. 90/011,477, dated Mar. 14, 2011, Reexamination of U.S. Patent No. 5,949,331, issued to Schofield et al.

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al., (Eds), "Intelligent Vehicle Tecnologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Pratt, "Digital Image Processing, Passage—ED.3", John Wiley & Sons, US, Jan. 1, 2001, pp. 657-659, XP002529771.

Donnelly Panoramic Vision™ on Renault Talisman Concept Car at Frankfort Motor Show, PR Newswire, Frankfort, Germany Sep. 10, 2001.

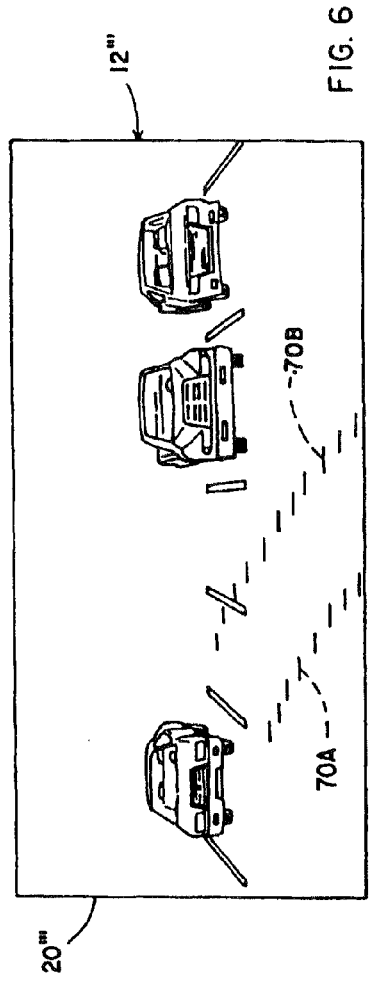
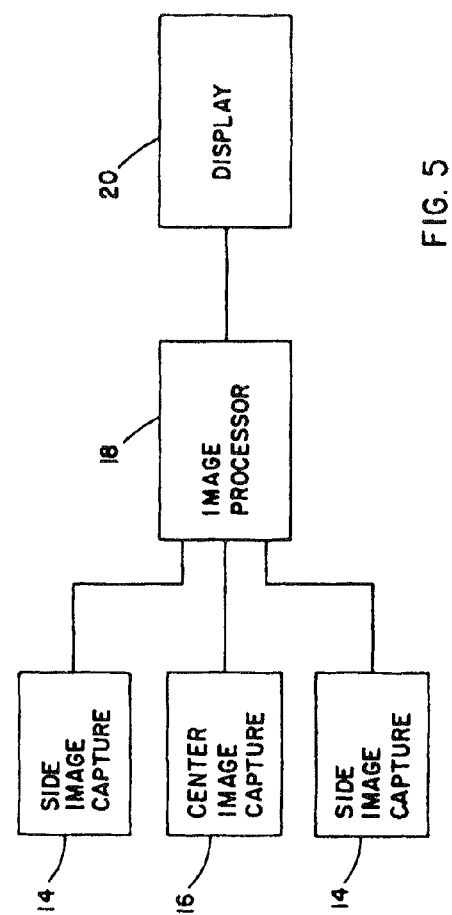
FIG. 6
FIG. 5

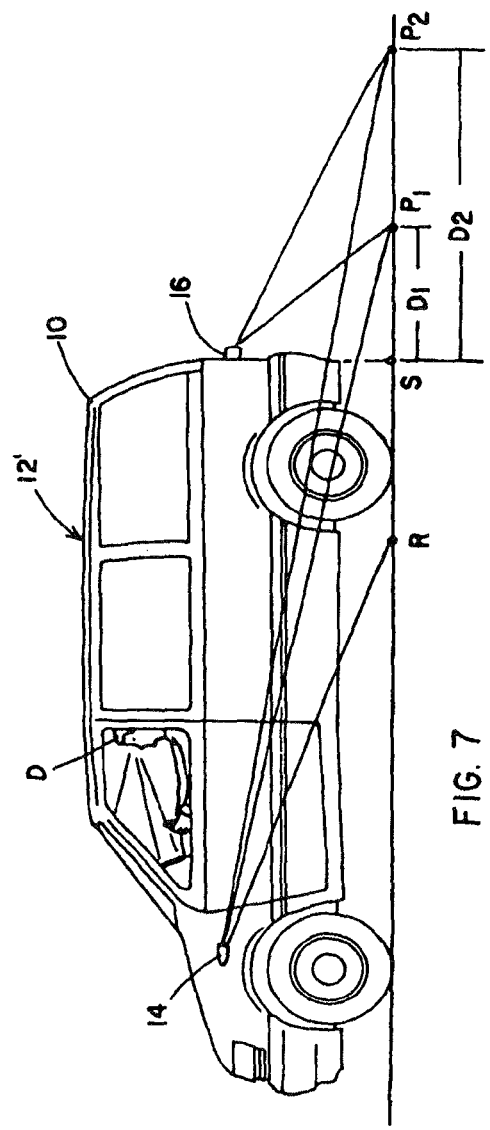
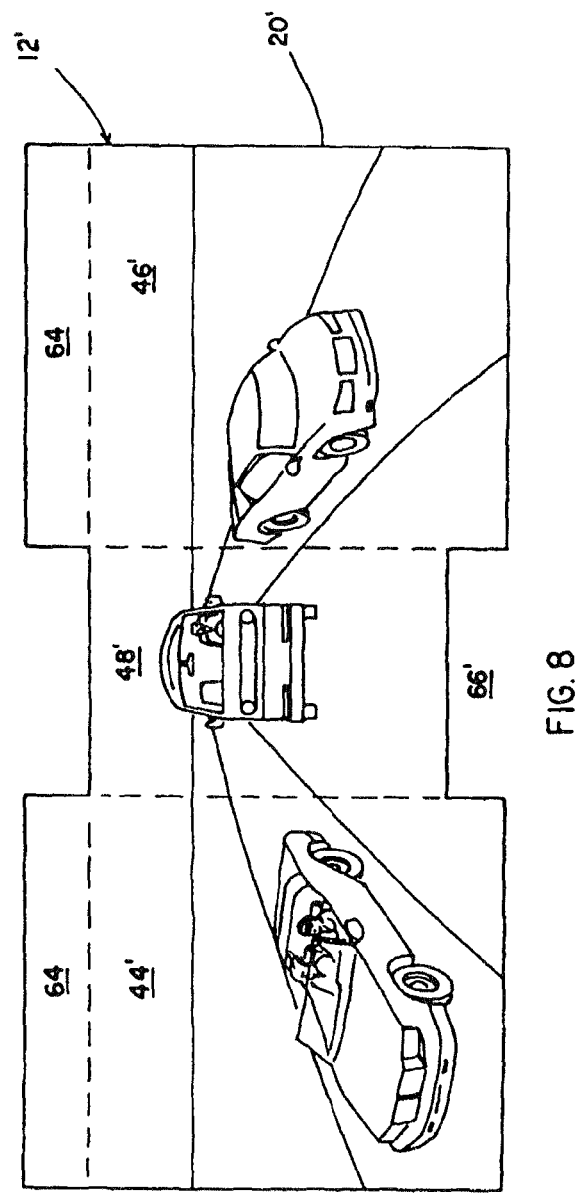

| N1 | N2 | | N1 | N2 | | N1 | N2 | | N1 | N2 |
|---|---|---|---|---|---|---|---|---|---|---|
| | | | 45 | 54 | | 94 | 146 | | 143 | |
| | | | 46 | 56 | | 95 | 149 | | 144 | |
| | | | 47 | 57 | | 96 | 151 | | 145 | |
| | | | 48 | 59 | | 97 | 154 | | 146 | |
| 1 | 1 | | 49 | 60 | | 98 | 156 | | 147 | |
| 2 | 2 | | 50 | 62 | | 99 | 159 | | 148 | |
| 3 | 3 | | 51 | 63 | | 100 | 162 | | 149 | |
| 4 | 4 | | 52 | 65 | | 101 | 164 | | 150 | |
| 5 | 5 | | 53 | 66 | | 102 | 167 | | 151 | |
| 6 | 6 | | 54 | 68 | | 103 | 170 | | 152 | |
| 7 | 7 | | 55 | 70 | | 104 | 172 | | 153 | |
| 8 | 8 | | 56 | 71 | | 105 | 175 | | 154 | |
| 9 | 9 | | 57 | 73 | | 106 | | | 155 | |
| 10 | 10 | | 58 | 74 | | 107 | | | 156 | |
| 11 | 11 | | 59 | 76 | | 108 | | | 157 | |
| 12 | 13 | | 60 | 78 | | 109 | | | 158 | |
| 13 | 14 | | 61 | 79 | | 110 | | | 159 | |
| 14 | 15 | | 62 | 81 | | 111 | | | 160 | |
| 15 | 16 | | 63 | 83 | | 112 | | | 161 | |
| 16 | 17 | | 64 | 85 | | 113 | | | 162 | |
| 17 | 18 | | 65 | 86 | | 114 | | | 163 | |
| 18 | 19 | | 66 | 88 | | 115 | | | 164 | |
| 19 | 20 | | 67 | 90 | | 116 | | | 165 | |
| 20 | 22 | | 68 | 92 | | 117 | | | 166 | |
| 21 | 23 | | 69 | 94 | | 118 | | | 167 | |
| 22 | 24 | | 70 | 95 | | 119 | | | 168 | |
| 23 | 25 | | 71 | 97 | | 120 | | | 169 | |
| 24 | 26 | | 72 | 99 | | 121 | | | 170 | |
| 25 | 28 | | 73 | 101 | | 122 | | | 171 | |
| 26 | 29 | | 74 | 103 | | 123 | | | 172 | |
| 27 | 30 | | 75 | 105 | | 124 | | | 173 | |
| 28 | 31 | | 76 | 107 | | 125 | | | 174 | |
| 29 | 33 | | 77 | 109 | | 126 | | | 175 | |
| 30 | 34 | | 78 | 111 | | 127 | | | | |
| 31 | 35 | | 79 | 113 | | 128 | | | | |
| 32 | 36 | | 80 | 115 | | 129 | | | | |
| 33 | 38 | | 81 | 117 | | 130 | | | | |
| 34 | 39 | | 82 | 119 | | 131 | | | | |
| 35 | 40 | | 83 | 121 | | 132 | | | | |
| 36 | 42 | | 84 | 124 | | 133 | | | | |
| 37 | 43 | | 85 | 126 | | 134 | | | | |
| 38 | 44 | | 86 | 128 | | 135 | | | | |
| 39 | 46 | | 87 | 130 | | 136 | | | | |
| 40 | 47 | | 88 | 132 | | 137 | | | | |
| 41 | 49 | | 89 | 135 | | 138 | | | | |
| 42 | 50 | | 90 | 137 | | 139 | | | | |
| 43 | 51 | | 91 | 139 | | 140 | | | | |
| 44 | 53 | | 92 | 142 | | 141 | | | | |
| | | | 93 | 144 | | 142 | | | | |

FIG. 11

MULTI-CAMERA VISION SYSTEM FOR A VEHICLE

CROSS-REFERENCE TO RELATED APPLICATIONS

This application is a continuation of U.S. patent application Ser. No. 12/688,146, filed Jan. 15, 2010, which is a continuation of U.S. patent application Ser. No. 12/496,357, filed Jul. 1, 2009, now U.S. Pat. No. 8,462,204, which is a continuation of U.S. patent application Ser. No. 11/122,880, filed May 5, 2005, now U.S. Pat. No. 7,561,181, which is a continuation of U.S. patent application Ser. No. 10/324,679, filed on Dec. 20, 2002, now U.S. Pat. No. 6,891,563, which is a continuation of U.S. patent application Ser. No. 08/952,026, filed under 35 U.S.C. §371, filed Nov. 19, 1997, now U.S. Pat. No. 6,498,620, which is based on International Patent Application No. PCT/US96/07382, filed May 22, 1996.

BACKGROUND OF THE INVENTION

This invention relates generally to vision systems for vehicles and, more particularly, to rearview vision systems which provide the vehicle operator with scenic information in the direction rearward of the vehicle. More particularly, the invention relates to a rearview vision system utilizing image capture devices, such as CMOS imaging arrays and the like.

A long-felt need in the art of vehicle rearview vision systems is to reduce the amount of time spent gathering information of the condition around the vehicle in order to safely carry out a vehicle maneuver, such as a turn or a lane change. It has been determined that up to about 50 percent of maneuver time is spent gathering information with conventional rearview mirrors. This typically requires viewing one or more mirrors, turning the head and body to check blind spots, and double-checking the mirrors prior to executing the maneuver. Some improvement has been obtained by adjusting mirror optics, for example, to increase the observed field of view rearward of the vehicle. However, this is achieved with an increase in image distortion which makes driver awareness of conditions to the side and rear of the vehicle even more difficult.

Another long-felt need in the art of vehicle rearview vision systems has been to eliminate exterior rearview mirrors by utilizing image capture devices, such as cameras, in combination with dashboard displays. This would be beneficial because it would reduce wind drag on the vehicle, wind noise and vehicle weight. Furthermore, rearview mirrors protrude a substantial distance from the side of the vehicle, which makes maneuvering in tight spaces more difficult. Image capture devices are capable of positioning in a greater variety of locations on the vehicle, providing more flexibility of vehicle styling. It is further expected that camera systems would greatly reduce the blind spots to the sides and rear of the vehicle common with vehicles equipped with conventional rearview mirror systems. The driver cannot perceive vehicles, objects, or other road users in such blind spots without turning his or her body, which interferes with forward-looking visual activities.

Camera-based rearview vision systems for vehicles have not obtained commercial acceptance. One difficulty with proposed systems has been that they present a large amount of visual information in a manner which is difficult to comprehend. This difficulty arises from many factors. In order to significantly reduce blind spots, multiple image capture devices are typically positioned at various locations on the vehicle. The image of an object behind the equipped vehicle is usually captured by more than one image capture device at a time and displayed in multiple images. This may confuse the driver as to whether more than one object is present. When multiple image capture devices are positioned at different longitudinal locations on the vehicle, objects behind the vehicle are at different distances from the image capture devices. This results in different image sizes for the same object. This effect is especially noticeable for laterally extending images, such as a bridge, highway crosswalk markings, the earth's horizon, and the like. Such images are at different vertical angles with respect to the image capture devices. This results in different vertical positions on the display causing the elongated image to appear disjointed.

A camera system provides a monocular view of the scene, compared to the binocular stereoscopic view obtained when the scene is viewed through a rearview mirror. This makes the ability to judge distances in a camera system a problem. This effect is most noticeable at distances close to the vehicle where stereoscopic imaging is relied upon extensively by the driver in judging relative locations of objects. Therefore, known camera systems fail to provide to the driver important information where that information is most needed at small separation distances from surrounding objects.

Another difficulty with camera systems is that, in order to provide a sufficient amount of information, the camera system typically presents the driver with a greatly increased field of view. This improves performance by further reducing blind spots at the side and rear of the vehicle. However, an increased field of view is often obtained by utilizing a wide-angle lens which introduces distortion of the scene and further impairs the ability of the driver to judge distances of objects displayed. The problem with such distortion of the scene is that the driver must concentrate more on the display and take a longer time to interpret and extract the necessary information. This further distracts the driver from the primary visual task of maintaining awareness of vehicles and other objects in the vicinity of the driven vehicle.

Yet an additional difficulty with camera systems is that flat panel displays present the image captured by the rearward-facing image capture device, or devices, at a focal length that approximates the arm length of the vehicle driver. In order to observe the condition of the vehicle utilizing the rearview vision system, the driver must change his or her gaze from the forward field of view of the vehicle to the display. Because the forward field of view of the vehicle is at a focal length that is much greater than the focal length of the displayed image, the eyes of the driver must refocus upon changing gaze. This refocusing further increases the amount of time for the driver to assimilate the information in the displayed image. Furthermore, when the gaze of the driver returns to the forward field of view, the eyes must, again, refocus to the greatly longer distance.

Yet an additional difficulty with camera systems is that of finding adequate space in the crowded area of the vehicle's dashboard for the components making up the display.

SUMMARY OF THE INVENTION

The present invention is directed towards enhancing the interpretation of visual information in a rearview vision system by presenting information in a manner which does not require significant concentration of the driver or present distractions to the driver. This is accomplished according to an aspect of the invention in a rearview vision system having at least two image capture devices positioned on the vehicle and directed generally rearwardly with respect to the direction of travel of the vehicle. A display is provided for images captured by the image capture devices. The display displays an image synthesized from outputs of the image capture devices which approximates a rearward-facing view from a single location. In order to obtain all of the necessary information of activity, not only behind but also along side of the vehicle, the virtual camera should be positioned forward of the driver. The image synthesized from the multiple image capture devices may have a dead space which corresponds with the area occupied by the vehicle. This dead space is useable by the driver's sense of perspective in judging the location of vehicles behind and along side of the equipped vehicle.

The present invention provides techniques for synthesizing images captured by individual, spatially separated, image capture devices into such ideal image, displayed on the display device. This may be accomplished, according to an aspect of the invention, by providing at least three image capture devices. At least two of the image capture devices are side image capture devices mounted on opposite sides of the vehicle. At least one of the image capture devices is a center image capture device mounted laterally between the side image capture devices. A display system displays an image synthesized from outputs of the image capture devices. The displayed image includes an image portion from each of the image capture devices. The image portion from the center image capture device is vertically compressed.

It has been discovered that such vertical compression substantially eliminates distortion resulting from the spatial separation between the cameras and can be readily accomplished. In an illustrated embodiment, the image compression is carried out by removing selective ones of the scan lines making up the image portion. A greater number of lines are removed further away from the vertical center of the image.

The compression of the central image portion produces a dead space in the displayed image which may be made to correspond with the area that would be occupied by the vehicle in the view from the single virtual camera. Preferably, perspective lines are included at lateral edges of the dead space which are aligned with the direction of travel of the vehicle and, therefore, appear in parallel with lane markings. This provides visual clues to the driver's sense of perspective in order to assist in judging distances of objects around the vehicle.

According to another aspect of the invention, image enhancement means are provided for enhancing the displayed image. Such means may be in the form of graphic overlays superimposed on the displayed image. Such graphic overlap may include indicia of the anticipated path of travel of the vehicle which is useful in assisting the driver in guiding the vehicle in reverse directions. Such graphic overlay may include a distance grid indicating distances behind the vehicle of objects juxtaposed with the grid.

According to yet an additional aspect of the invention, a rearview vision system for a vehicle includes at least one image capture device positioned on the vehicle and directed generally rearwardly with respect to the direction of travel of the vehicle. A display system is provided which displays a rear image synthesized from an output of the image capture device. The rear image is substantially contiguous with the forward field of view of the vehicle driver and at a focal length that is forward of the vehicle passenger compartment and preferably within the depth of field of a vehicle driver viewing a distant object. Because the image has a focal length that more closely matches that of the forward field of view observed by the driver, the need for the driver's eyes to refocus from the forward field of view to a much shorter focus distance each time the gaze of the driver is directed at the display system is minimized. This reduces the amount of time required for the driver to gaze at the displayed image and interpret objects displayed in the image. Furthermore, the reduction in the repeated refocusing of the driver's eyes reduces driver fatigue. If there are any near field objects in the periphery of the driver's forward field of view, such as windshield wipers, windshield frame, dashboard, and the like, the display system is preferably positioned in a manner which blocks the view of such near field objects. In this manner, the driver's gaze may shift between the forward field of view and the long focal length display system without being refocused on the near field objects. This is based upon a recognition that the driver's eyes will tend to refocus on the near field object momentarily even though the gaze is being redirected between the forward field of view and the display system.

According to yet an additional aspect of the invention, a rearview vision system for a vehicle includes at least one image capture device positioned on the vehicle and directed generally rearwardly with respect to the direction of travel of the vehicle. A display system is provided for displaying a rear image captured by the image capture device. The displayed image is a unitary image having an aspect ratio that is between approximately 4:1 and approximately 2:1. In a most preferred embodiment, the image has an aspect ratio that is approximately 8:3. The aspect ratio, according to this aspect of the invention, is especially useful where the unitary image is synthesized from a plurality of images which are captured by a plurality of image captured devices and are tiled by the display device.

According to yet an additional aspect of the invention, a rearview vision system for a vehicle includes a plurality of image capture devices positioned on the vehicle and directed generally rearwardly with respect to the direction of travel of the vehicle. A display system which includes at least one image generator and an optical correction system is provided which displays an image synthesized from outputs of the image capture devices as a unitary image. Alternatively, the display system may include a plurality of image generators, each associated with one or more of the image capture devices and an optical correction system which amplifies images generated by the image generators and merges them into a unitary image. The optical correction system additionally increases the focal length, or lengths, of the image, or images, generated by the image generator, or generators. The display system may be an opaque projection display which is positioned approximately at the driver's arm length in front of the driver. Alternatively, the display system may be a viewthrough heads-up display which projects the unitary image onto a combiner in order to combine the unitary image with the forward field of view of the driver.

These and other objects, advantages, and features of this invention will become apparent by review of the following specification in conjunction with the drawings.

BRIEF DESCRIPTION OF THE DRAWINGS

FIG. 5 is a block diagram of an electronic system according to the invention;

FIG. 6 is the same view as FIG. 3 illustrating an alternate mode of operation of the system;

FIG. 7 is the same view as FIG. 2 illustrating an alternative embodiment of the invention;

FIG. 8 is the same view as FIG. 3 illustrating an alternative embodiment of the invention;

FIG. 11 is a chart illustrating the horizontal row of pixels (n1, n2) on which an object will be imaged from two longitudinally separated image capture devices as that object is spaced at different longitudinal distances from the image capture devices;

DESCRIPTION OF THE PREFERRED EMBODIMENT

Figure 1:
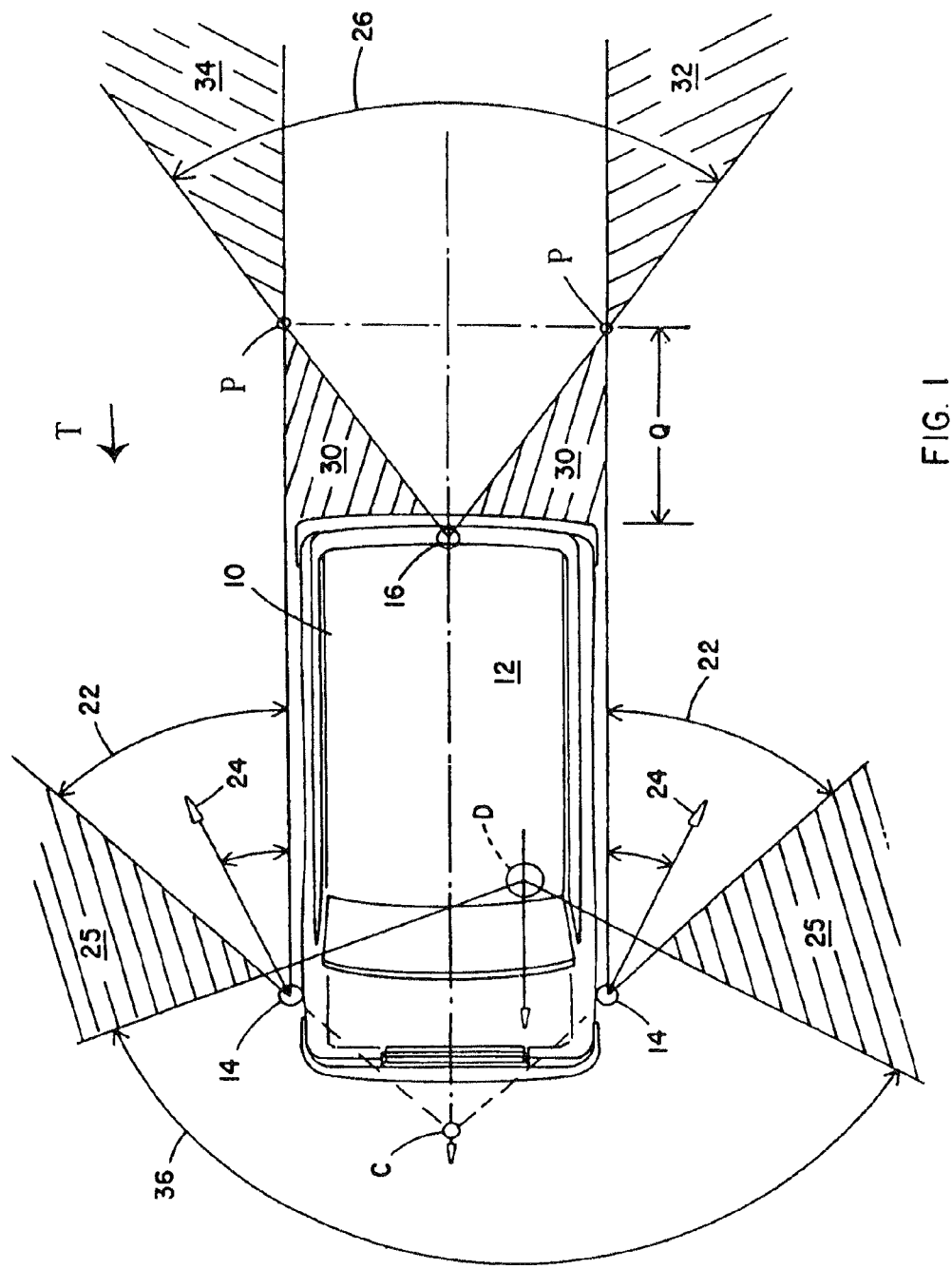
FIG. 1 is a top plan view of a vehicle having a rearview vision system according to the invention.

Referring now specifically to the drawings, and the illustrative embodiments depicted therein, a vehicle 10, which may be an automobile, a light truck, a sport utility vehicle, a van, a bus, a large truck, or the like includes a rearview vision system, generally illustrated at 12, for providing a driver of the vehicle with a view rearwardly of the vehicle with respect to the direction of travel T of the vehicle (FIG. 1). Vision system 12 includes at least two side image capture devices 14 positioned, respectively, on opposite sides of vehicle 10 and a center image capture device 16 positioned on the lateral centerline of the vehicle. All of the image capture devices are directed generally rearwardly of the vehicle. Rearview vision system 12 additionally includes an image processor 18 for receiving data signals from image capture devices 14, 16 and synthesizing, from the data signals, a composite image 42 which is displayed on a display 20.

As will be set forth in more detail below, the images captured by image capture devices 14, 16 are juxtaposed on display 20 by image processor 18 in a manner which approximates the view from a single virtual image capture device positioned forwardly of the vehicle at a location C and facing rearwardly of the vehicle, with the vehicle being transparent to the view of the virtual image capture device. Vision system 12 provides a substantially seamless panoramic view rearwardly of the vehicle without duplicate or redundant images of objects. Furthermore, elongated, laterally-extending, objects, such as the earth's horizon, appear uniform and straight across the entire displayed image. The displayed image provides a sense of perspective, which enhances the ability of the driver to judge location and speed of adjacent trailing vehicles.

Each of side image capture devices 14 has a field of view 22 and is aimed rearwardly with respect to the vehicle about an axis 24 which is at an angle, with respect to the vehicle, that is half of the horizontal field of view of the image capture device. In this manner, each of the image capture devices 14 covers an area bounded by the side of the vehicle and extending outwardly at an angle defined by the horizontal field of view of the respective side image capture device. Center image capture device 16 has a horizontal field of view 26, which is symmetrical about the longitudinal axis of the vehicle. The field of view of each side image capture device 14 intersect the field of view of center image capture device 16 at a point P which is located a distance Q behind vehicle 10.

Figure 2:
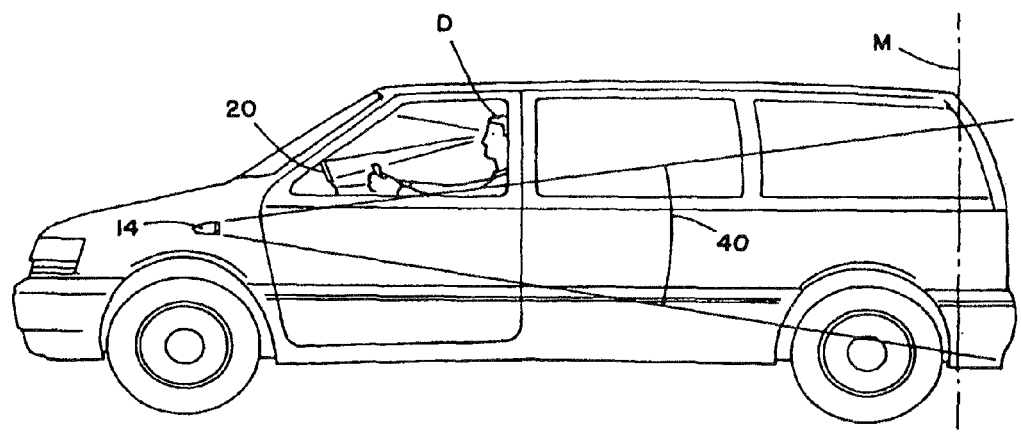
FIG. 2 is a side elevation of the vehicle in FIG. 1.
Figure 4:
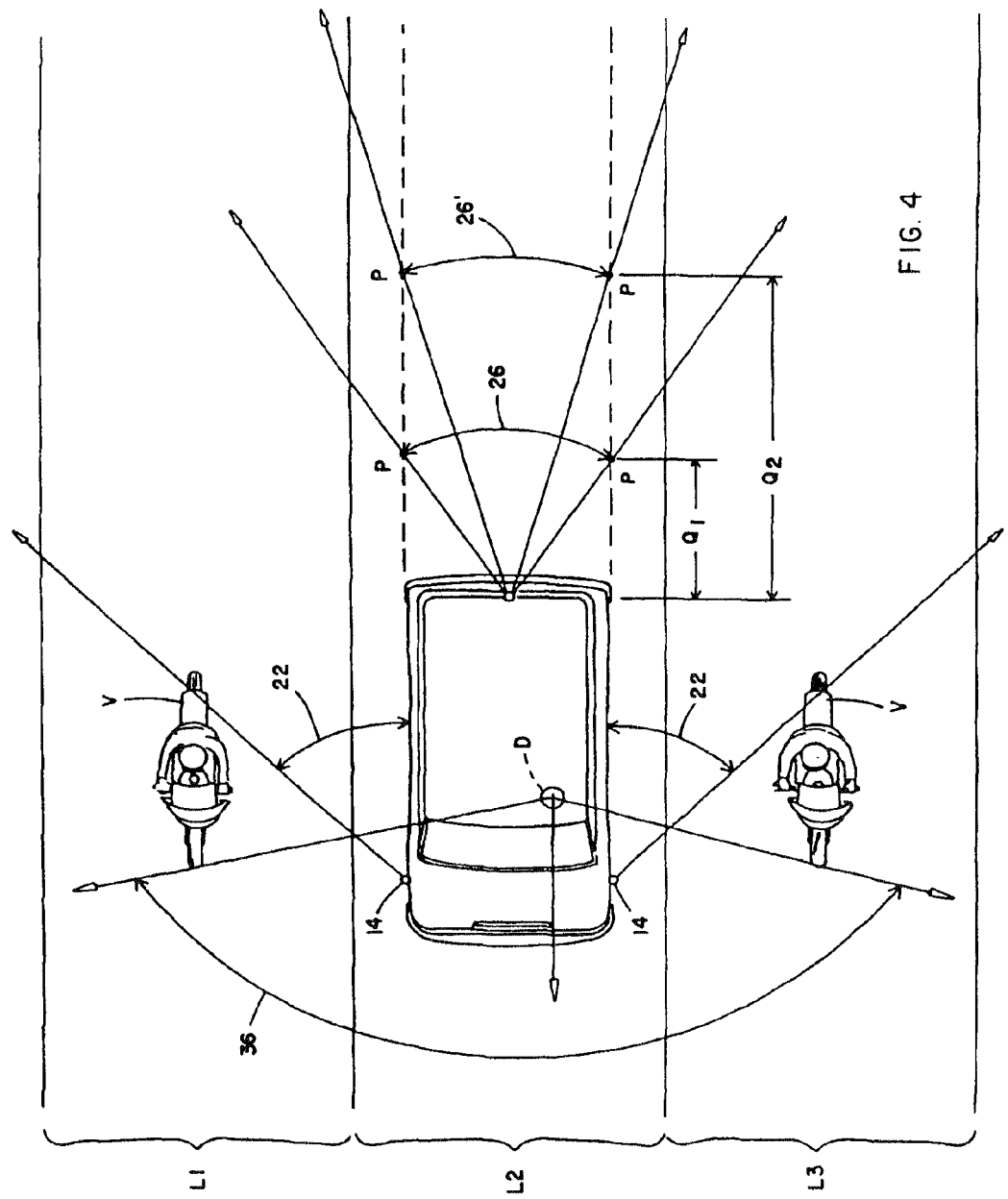
FIG. 4 is the same view as FIG. 1 illustrating an alternative embodiment of the invention.
Figure 9:
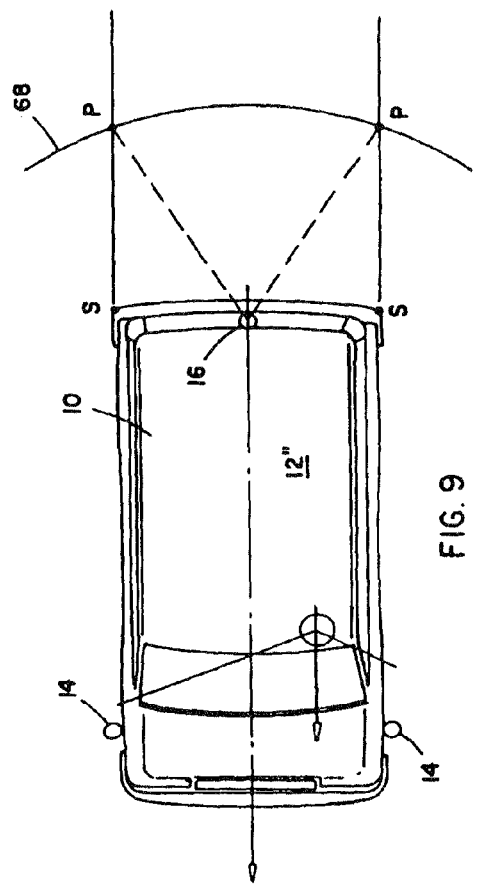
FIG. 9 is the same view as FIGS. 1 and 4 illustrating an alternative embodiment of the invention.

Rear blind zones 30 are located symmetrically behind vehicle 10 extending from the rear of the vehicle to point P. Side blind zones 25 located laterally on respective sides of the vehicle extend rearwardly of the forward field of view 36 of the driver to the field of view 22 of the respective side image capture device 14. An object will not be captured by side image capture devices 14 or center image capture device 16 if the object is entirely within one of the blind zones 25, 30. In order for an object, such as another vehicle V or other road user travelling to the side of vehicle 10, to be observed by an operator of vehicle 10, the object must be either at least partially within the forward field of view 36 of the driver or be captured by image capture devices 14, 16 and displayed on display 20. FIG. 4 illustrates vehicle 10 travelling on a three-lane highway having lanes L1, L2, and L3 with the vehicle in lane L2. Another vehicle V is shown positioned mostly within one of the blind zones 25, but with the rearmost portion of the vehicle V extending into field of view 22 where the vehicle image will be captured by one of side image capture devices 14. In the illustrated embodiment, vehicle V is a motorcycle travelling in the center of lanes L1 or L3 and represents a worst case for observing a vehicle travelling at least partially within one of the blind zones 25. In order for a portion of vehicle V to be extending either forwardly or rearwardly of the respective blind zone 25, where the vehicle V may be observed by either the forward field of view 36 of the driver or by the rearview vision system 12, the field of view 22 of side image capture devices 14 must be sufficiently wide to capture a portion of vehicle V as illustrated in FIG. 4. Preferably, the horizontal field of view 22 of side image capture devices 14 is no greater than that required to provide sufficient coverage which would be in the range of between approximately 55 degrees and approximately 70 degrees. In the illustrated embodiment, the horizontal field of view 22 is 61 degrees. In order for a portion of vehicle V to be within a vertical field of view 40 of one of side image capture devices 14, the field of view should extend to the pavement at a plane M which intersects vehicle V (FIG. 2). Preferably, vertical field of view 40 is between approximately 60 degrees and approximately 75 degrees. In the illustrated embodiment, vertical field of view 40 is 66 degrees.

A left overlap zone 32 and a right overlap zone 34 extend rearward from respective points P where the horizontal fields of view of the side image capture devices intersect the field of view of center image capture device 16. Overlap zones 32, 34 define areas within which an object will be captured both by center image capture device 16 and one of the side image capture devices 14. An object in an overlap zone 32, 34 will appear on display 20 in multiple image portions in a redundant or duplicative fashion. In order to avoid the presentation of redundant information to the driver, and thereby avoid confusion and simplify the task of extracting information from the multiple images or combined images on display 20, the object should avoid overlapping zones 32, 34. In practice, this may be accomplished to a satisfactory extent by moving points P away from the vehicle and thereby increasing distance Q. It is desirable to increase distance Q to a length that will exclude vehicles travelling at a typical separation distance behind vehicle 10 from overlapping zones 32, 34. This separation distance is usually a function of the speed at which the vehicles on the highway are travelling. Therefore, optionally, distance Q may be made variable, not fixed. In such embodiment, the faster the vehicles are travelling, the further Q should be moved behind vehicle 10 to keep overlap zones 32 and 34 outside of the recommended vehicle spacing. If, however, the vehicles are travelling at a slower speed, then the generally accepted recommendation for vehicle spacing decreases and it is more likely that a vehicle will be within overlap zone 32, 34. Therefore, the distance Q may be selected to accommodate expected vehicle spacing for an average driving speed of vehicle 10.

Distance Q is a function of the effective horizontal field of view 26 of center image capture device 16. As field of view 26 decreases, points P move further rearward of the vehicle from a distance Q1, to a distance Q2, as best illustrated in FIG. 4. In order to increase distance Q to eliminate redundant and duplicative information displayed on display 20 for most driving conditions of vehicle 10, field of view 26 is preferably less than 12 degrees. In the illustrated embodiment, field of view 26 is between 6 and 8 degrees. Alternatively, distance Q may be dynamically adjusted according to some parameter, such as the speed of vehicle 10. This would allow Q to be greater when the vehicle is travelling at a faster speed, where vehicle separation tends to be larger, and vice versa. Field of view 26 may be adjusted by utilizing a selective presentation of pixels of the captured image in the displayed image.

Figure 3:
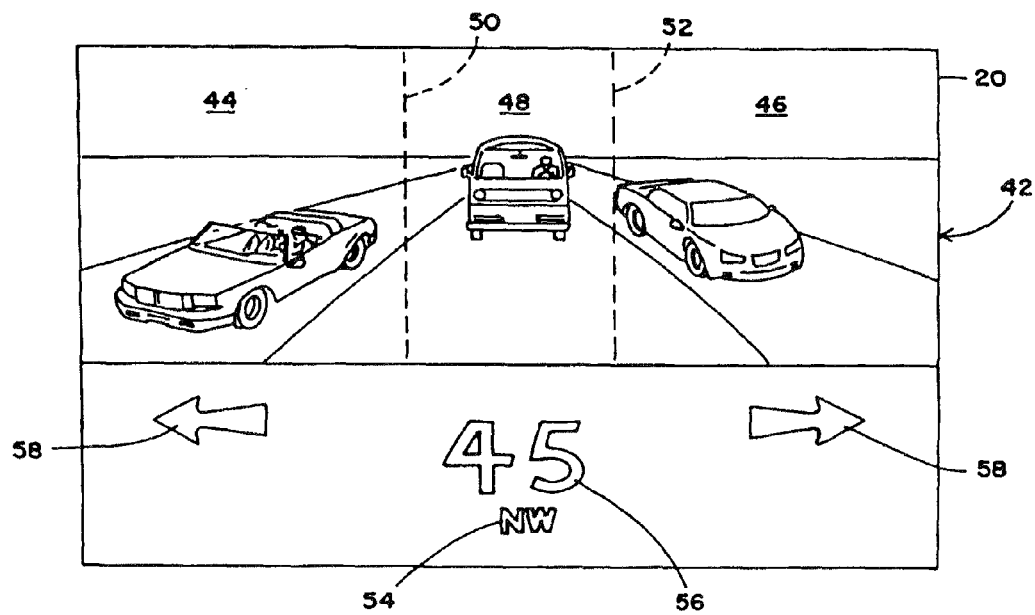
FIG. 3 is a front elevation of a display according to the invention.

Referring to FIG. 3, image display device 20 displays a composite image 42 made up of a left image portion 44, a right image portion 46, and a center image portion 48. Each image portion 44-48 is reversed from the image as captured by the respective image capture device 14, 16 utilizing conventional techniques. These techniques include reading the image in reverse with the image capture device, writing the image in reverse to display device 20, or reversing the image in image processor 18. Left image portion 44 is joined with central image portion 48 at a boundary 50. Central image portion 48 is joined with right image portion 46 at a boundary 52. As may best be seen in FIG. 3, the image portions at boundaries 50 and 52 are continuous whereby composite image 42 is a seamless panoramic view rearwardly of the vehicle. As also is apparent from FIG. 3, central image portion 48 is narrower than either left image portion 44 or right image portion 46. This is a result of reducing the horizontal field of view 26 of center image capture device 16 sufficiently to move points P, and thus overlap zones 32 and 34, a sufficient distance behind vehicle 10 to reduce redundant and duplicative images between image portions 44-48. Composite image 42 provides a clear image, which avoids confusion and simplifies the task of extracting information from the multiple image portions 44-48. As also may be seen by reference to FIG. 3, display 20 may additionally include indicia such as the readout of a compass 54, vehicle speed 56, turn signals 58, and the like as well as other graphical or video displays, such as a navigation display, a map display, and a forward-facing vision system. In this manner, rearview vision system 12 may be a compass vision system or an information vision system.

In the embodiment of rearview vision system 12 having a dynamically adjusted value of distance Q, the spacing between boundaries 50 and 52 will dynamically adjust in sequence with the adjustment of distance Q. Thus, as overlap zones 32, 34 move further away from the vehicle; for example, in response to an increase in speed of the vehicle, boundary lines 50 and 52 will move closer together and vice versa. In this manner, composite image 42 is dynamic, having image portions of dynamically adaptive sizes.

Figure 12:
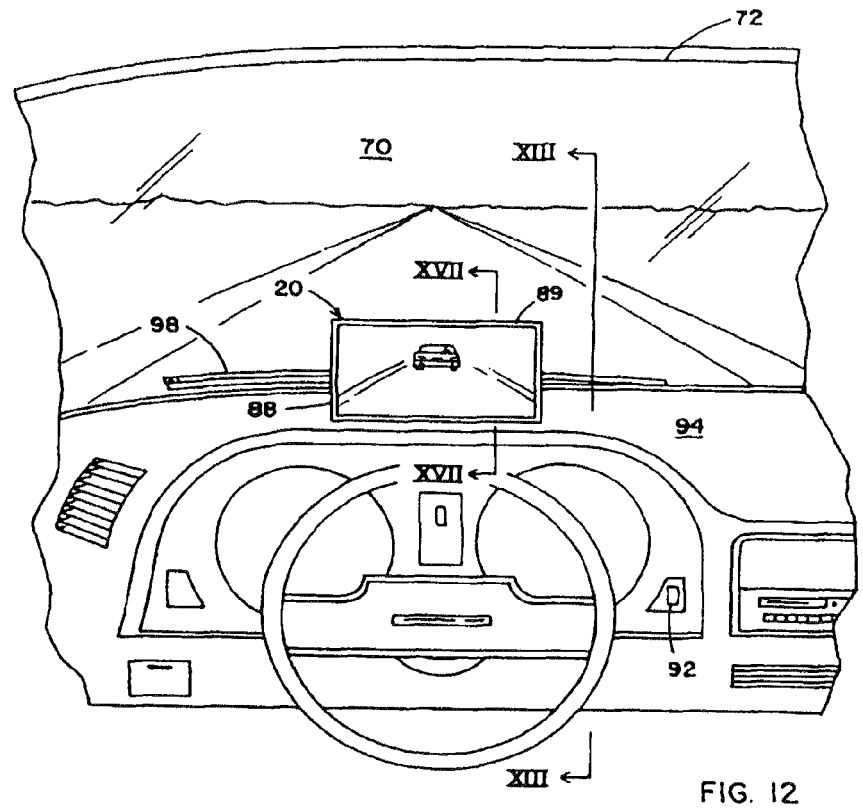
FIG. 12 is a forward elevation of a vehicle passenger compartment as viewed by a vehicle driver.

Display 20 is of a size to be as natural as possible to the driver. This is a function of the size of the displayed image and the distance between the display and the driver. Preferably, the displayed image simulates an image reflected by a rearview mirror. As such, the size of the displayed image is approximately the combined areas of the three rearview mirrors (one interior mirror and two exterior mirrors) conventionally used with vehicles. As best seen by reference to FIGS. 2 and 12, display 20 is preferably positioned within the driver's physiological field of view forward of the vehicle, generally illustrated at 70, through the windshield 72 without significantly obstructing the forward field of view. It is known that the driver's field of view, with the head and eyes fixed forward, extends further in a downward direction than in an upward direction. Display 20 could be located above the field of view 70 wherein the display may be observed at the upward portion of the driver's field of view. However, the position for the display illustrated in FIGS. 2 and 12 is preferred wherein the display is within the lower portion of the driver's field of view.

Display 20 may be a direct view flat panel display, such as a back-lit or reflective liquid crystal display, a plasma display, a field emission display, a cathode ray tube electroluminescent, light-emitting diode or deformable mirror display. The display may be mounted/attached to the dashboard, facia or header, or to the windshield at a position conventionally occupied by an interior rearview mirror. However, the synthesized image could be displayed using other display techniques such as to provide a projected or virtual image. Alternatively, a virtual image may be displayed on an opaque display adjacent the forward field of view. Alternatively, a virtual image may be displayed on a view-through heads-up display in which the image is superimposed on the forward field of view.

In the embodiment illustrated in FIGS. 12-17, display 20 displays an image at a focal length that is forward of the passenger compartment of vehicle 10. Preferably, the image displayed by display 20 is at a focal length that is within the driver's normal depth of field when viewing a distant object. Display 20 includes an image generator 74, which produces an image captured by one or more image capture devices 14, 16, and an optical correction system 76, which increases the focal distance of the image generated by image generator 74. In the illustrated embodiment, optic correction system 76 increases the focal distance by collimating the rays, generally indicated at X, from diverging rays to generally parallel rays projected from the display. Optical correction system 76 additionally magnifies the image. In the illustrated embodiment, the magnification is a factor of two. In this manner, optical corrective system 76 has the advantage of extending the focal distance of the image generated by image generator 74 and enlarging the image by the factor of magnification thereof.

This advantageously allows each image generator 74 to project all or a portion of an image captured by one of image capture devices 14, 16, or a combination of portions of images from one or more image capture devices, by tiling the images or image portions. This is accomplished because the images projected from optical correction system 76 may abut even though the corresponding image generators 74 do not. This provides a convenient technique for joining the images synthesized from the image capture devices into a unitary image which represents a panoramic view rearward of the vehicle.

Figure 14:
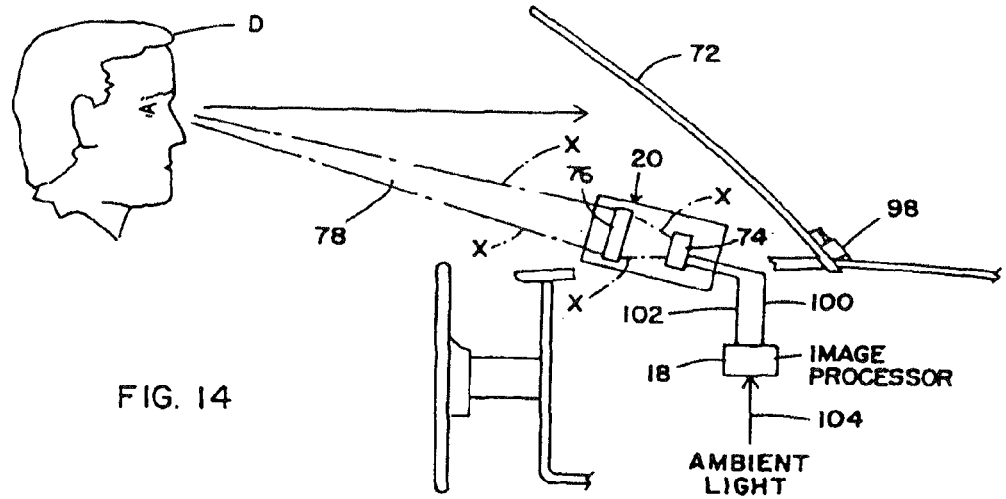
FIG. 14 is a sectional view taken along the lines XIV-XIV in FIG. 12.

In the embodiment illustrated in FIG. 14, display 20 is an opaque projection display which projects the image directly toward the driver. In the embodiment illustrated in FIG. 15, a display device 120 is a view-through heads-up display in which the rays X are projected generally upwardly by image generator 74 and optical correction system 76 which are generally vertically aligned, or aligned forward of vertical. The rays X are reflected off a first surface of windshield 72 in the direction of the driver. Windshield 72 acts as a combiner which combines the image displayed by display 120 with a portion of the forward field of view 70 observed by the driver. In the embodiment illustrated in FIG. 15, a combiner other than the windshield may be used. Examples may be holographic or diffractive optical film elements or beam splitters of metal or dielectric thin films. Furthermore, image processor 18 may generate a line in the shape of a polygon, such as a rectangle, around rear image 42. This provides a border around the image to differentiate the rear view from the view forward of the vehicle.

Figure 16:
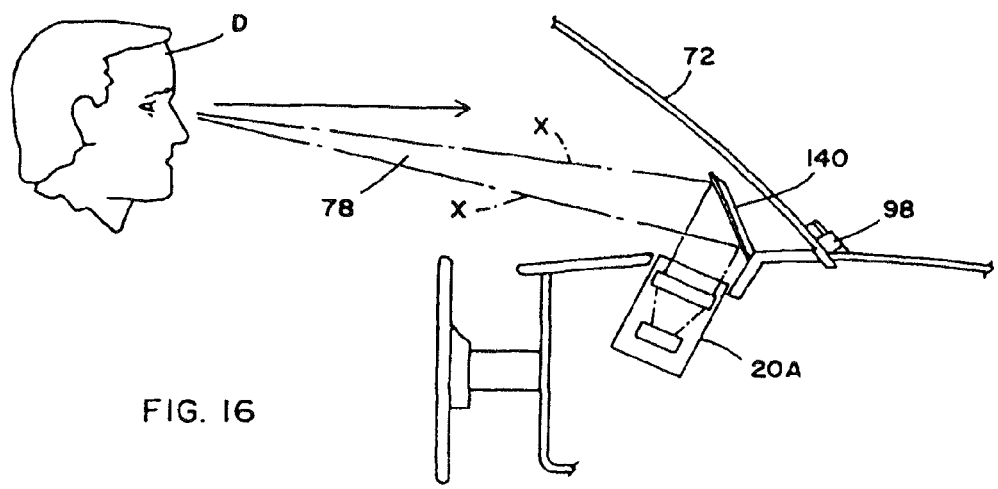
FIG. 16 is the same view as FIG. 14 of another alternative embodiment.

In the embodiment illustrated in FIG. 16, display 20A is oriented at an angle with respect to the forward field of view of driver D. Image rays X are reflected by a mirror 140 toward the driver. Display 20A is an opaque display, with mirror 140 blocking the driver's view of near field objects, such as wipers 98 and the like. Display 20A has the advantage of being capable of location within a forward portion of the dashboard. Additionally, the only portion of the display visible to the driver is mirror 140. This allows near field portions of the display to be significantly reduced.

Figure 13:
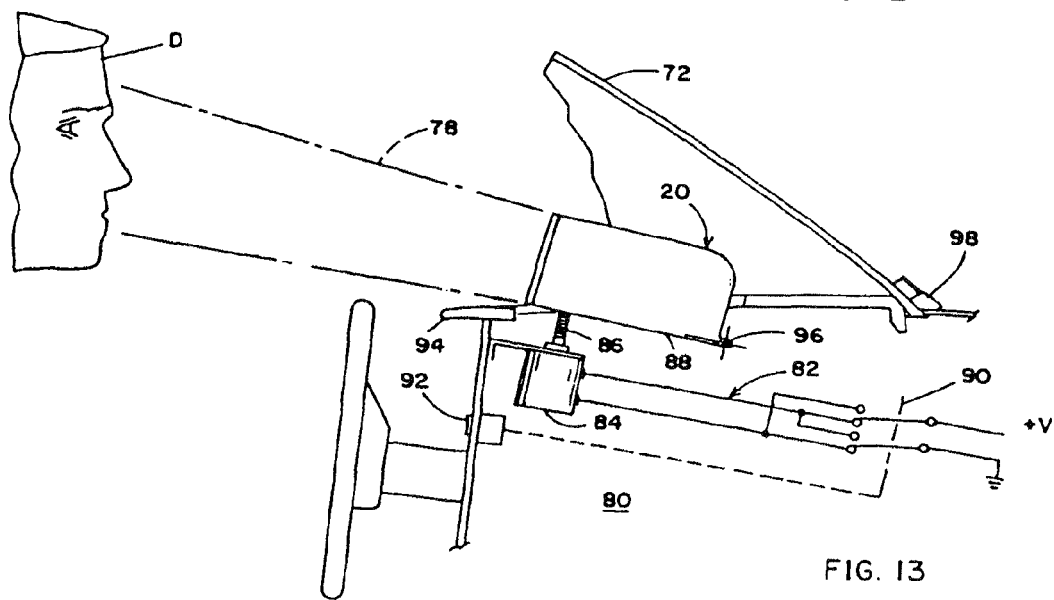
FIG. 13 is a sectional view taken along the lines XIII-XIII in FIG. 12.
Figure 15:
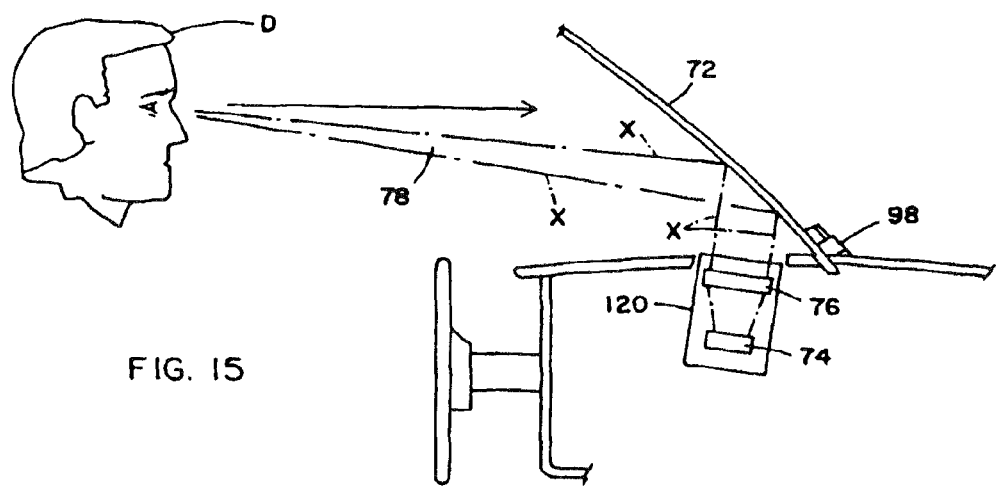
FIG. 15 is the same view as FIG. 14 of an alternative embodiment.

Because display 20 has a relatively long focus distance, display 20 defines an observation cone, generally designated 78, within which the displayed image can be observed. Therefore, the head of the driver must be properly oriented with respect to observation cone 78 in order to allow the driver to observe the displayed image. However, drivers come in various sizes. Therefore, a driver may be too tall or too short to have his or her head properly positioned within observation cone 78. In order to provide for various size drivers along with various adjustments in seating positions and the like, an accommodation means, generally illustrated at 80, may be provided in order to accommodate variations in the relationship between a driver's head and observation cone 78. In the illustrated embodiment, accommodation means 80 includes adjustment means 82 for adjusting the position of observation cone 78. The adjustment means may adjust the position of the observation cone either vertically, horizontally, or both vertically and horizontally. A vertical adjustment means 82 is illustrated in FIG. 13 in which the adjustment means includes an electric actuator 84 which is joined by linkage 86 with a portion of a housing 88 of display 20. Actuator 84 is electrically interconnected through a reversing switch 90 with a driver-operated actuator 92 which may be positioned on dashboard 94 or other convenient position accessible to the driver. Housing 88 may be adjustably mounted, such as by a pivot 96, in order to allow housing 88 to be adjustably repositioned with respect to dashboard 94. In this manner, by operation of actuator 92, housing 88 may be pivoted upwardly or downwardly with respect to pivot 96 in order to adjust the direction of observation cone 78. In this manner, the location of observation cone 78 may be adjusted in order to coincide with the location of the driver's head. In a similar fashion, the position of observation cone 78 may be adjusted laterally, if desired. If a view-through heads-up display of the type illustrated in FIG. 15 is utilized, the position of the observation cone may be adjusted vertically and laterally, in a similar manner, by mechanical or optical adjustments of display 20.

Accommodation means 80 may include extending the rearward field of view displayed by display 20 laterally outwardly with respect to the bezel 89 beyond that normally observed by a driver. In this manner, a driver's head located generally centrally within observation cone 78 will observe a view generally rearwardly of the vehicle. As the driver's head is moved laterally within observation cone 78, the driver will observe images more laterally to the side of the vehicle as would occur if the driver's head were to be moved with respect to a conventional optical rearview mirror system.

Vehicle 10 may include one or more near field view objects adjacent forward field of view 70. One such object is a windshield wiper 98 of the vehicle. Other such objects may include the top of dashboard 94, the frame around windshield 72, the hoodline, and the like. The housing of display 20 in FIG. 14 and mirror 140 in FIG. 15 are positioned with respect to forward field of view 70 such that housing 88 or mirror 140 covers any near field of view objects in the portion of the forward field of view adjacent display 20, 20A. In this manner, the gaze of the driver can switch between forward field of view 70 and the image displayed on display 20, without the eyes of the driver focusing on any significant near field objects. This is based upon a discovery that, even though the eyes of the driver are switching between the long focal distance of the forward field of view and the long focal distance of the image displayed by display 20, the eyes of the operator will unconsciously momentarily focus on any near field object positioned between the long focal distance views. Therefore, by blocking the driver's gaze of any near field objects, the eyes of the driver will be less stimulated to refocus during the transition from field of view 70 to display 20 and back again.

Image processor 18, which supplies a video signal 100 to image generator 74, may have a second input 102 which modulates the intensity level of the image generated by image generator 74 and displayed by display 20 (FIG. 14). The illumination level of the display is set in response to an ambient light input 104 which is an indication of the ambient light level around vehicle 10. Image processor 18 responds to the value of ambient light input 104 by producing a luminance intensity signal 102 which increases the intensity of the display in response to increases in ambient light level and decreases the intensity of the display in response to decreases in ambient light level. However, the level of display luminance may be limited to vary between upper and lower limits such that, once ambient light reaches a particular upper level, further increases in ambient light level will not result in a further increase in display intensity. Likewise, once the ambient light level decreases below a particular value, further reductions in ambient light level will not result in further reduction in display intensity. Ambient light input 104 may be produced by a separate ambient light sensor of the type which produces a continuously variable output in response to variations in ambient light levels, in which case, the intensity of display 20 may be proportionately adjusted. Alternatively, ambient light input 104 may be produced by a vehicle headlight control system (not shown) which switches the vehicle headlights on, or to a nighttime condition, in response to decreases in ambient light levels and switches the vehicle headlights off, or to a daytime running light condition, in response to increasing ambient light levels. Such system is disclosed in commonly assigned U.S. patent application Ser. No. 08/277,674 filed on Jul. 19, 1994, by Kenneth L. Schierbeek and Niall R. Lynam for an AUTOMATIC REARVIEW MIRROR SYSTEM WITH AUTOMATIC HEADLIGHT ACTIVATION, the disclosure of which is hereby incorporated herein by reference. If the ambient light signal supplied to ambient light input 104 is a binary signal representative of a daytime ambient light level and a nighttime ambient light level, image processor 18 would typically provide a signal on luminance intensity line 102 that would switch the intensity level of display 20 between two intensity levels. Alternatively, ambient light input 104 may be supplied with a signal developed by one or more image capture devices 14, 16. The ambient light signal would be based upon an average intensity value sensed by all, or a group of, pixels in the image capture device or devices. This embodiment eliminates the necessity for a separate ambient light sensor. Alternatively, ambient light input 104 may be responsive to manual actuation of the vehicle's headlights by the driver. Additionally, a comfort level setting may be provided to allow the driver to adjust to a preferred brightness at one ambient light condition. Thereafter, the system automatically adjusts display brightness according to ambient light changes.

Figure 17:
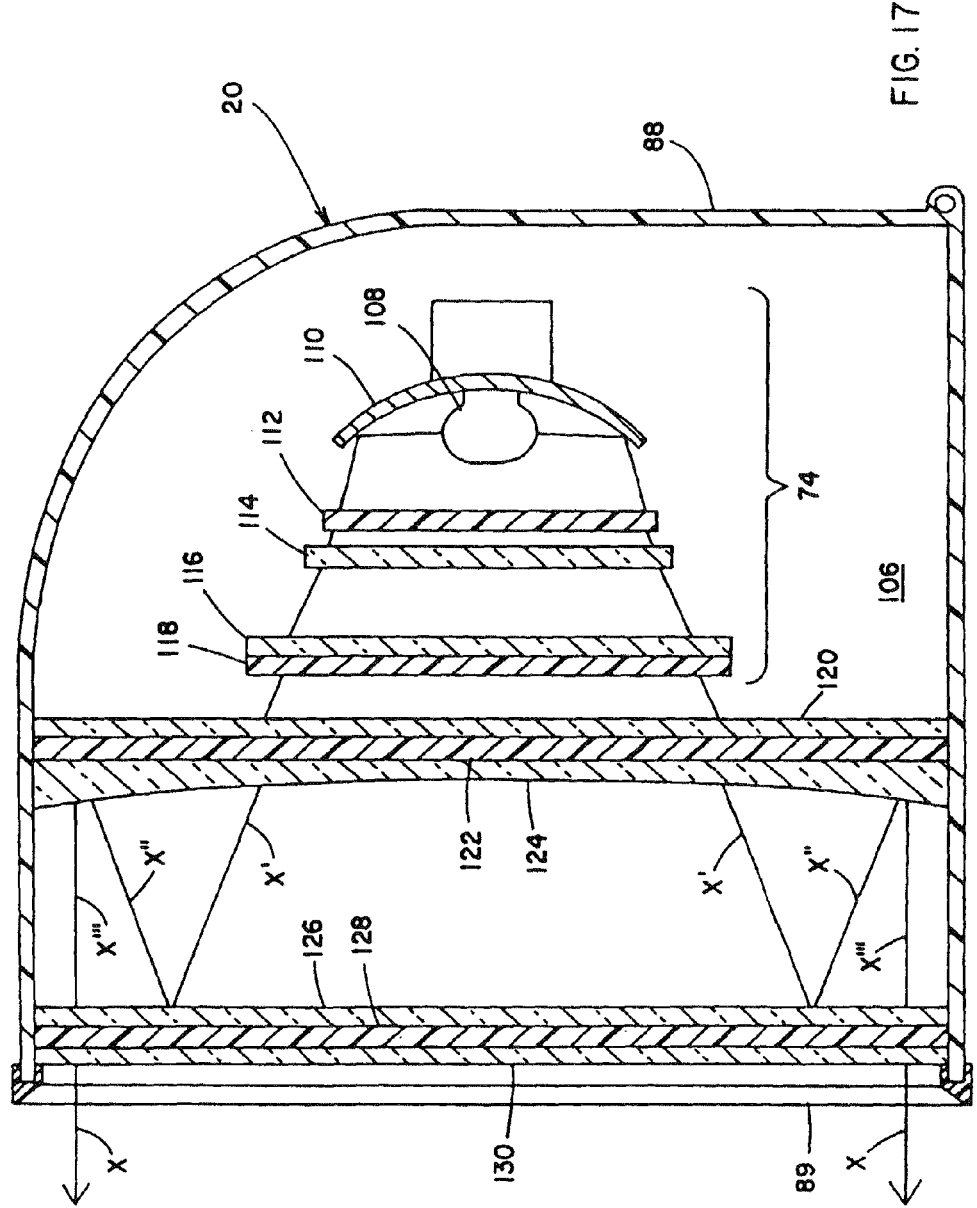
FIG. 17 is an enlarged view of the display system in FIG. 14 illustrating details thereof.
Figure 18:
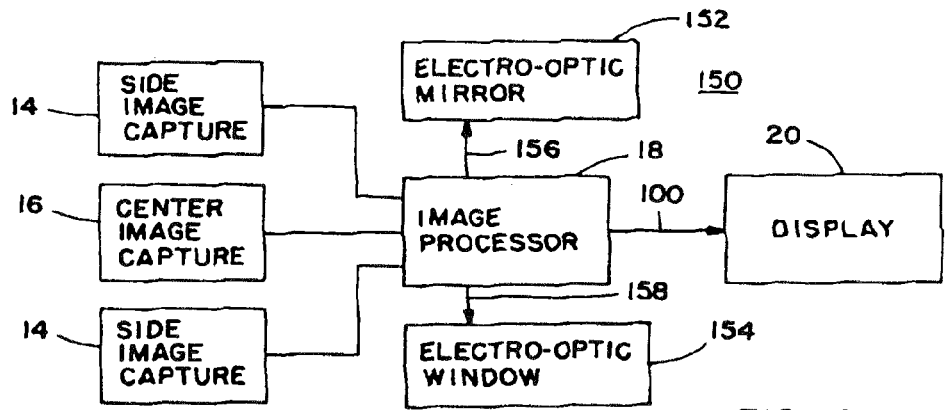
FIG. 18 is a block diagram similar to FIG. 5 of an alternative embodiment of the invention.

In the illustrated embodiment, display 20 incorporates a combined image generator and optical correction system 106 which provides for both image magnification and light ray collimation. In this manner, the image projected from display 20 is larger than the image generated by image generator 74 and has a focal length that is greater than the separation distance between the image generator and the driver and, preferably, is generally at infinity (FIG. 17). Combined image generator and an optical correction system 106 is disclosed in detail in U.S. Pat. No. 5,050,966 for an OPTICAL COMBINER COLLIMATING APPARATUS; U.S. Pat. No. 4,859,031 for an OPTICAL COLLIMATING APPARATUS; U.S. Pat. No. 4,900,133 for a HEADS-UP DISPLAY COMBINER UTILIZING A CHOLESTERIC LIQUID CRYSTAL ELEMENT; U.S. Pat. No. 4,987,410 for a MULTIPLE IMAGE FORMING APPARATUS; and U.S. Pat. No. 5,408,346 for an OPTICAL COLLIMATING DEVICE EMPLOYING CHOLESTERIC LIQUID CRYSTAL AND NON-TRANSMISSIVE REFLECTOR, the disclosures of which are hereby incorporated herein by reference and will not be repeated. Suffice it to say, combined image generator and optical correction system 106 includes a light source 108 which generates broad band white light which is gathered and reflected by a parabolic reflector 110. In the illustrative embodiment, light source 108 is a tungsten halogen incandescent lamp. The light rays then pass through a dielectric green filter 112 which passes light in a specific region of the green portion of the spectrum and through a hot mirror 114 which removes the infrared content of the spectrum. Light then passes through a holographic diffuser 116 which homogenizes and shapes the light pattern. The light rays then pass through a monochrome liquid crystal display with opposing linear polarizers 118 which is supplied with a video signal by image processor 18. Items 108-118 make up image generator 74, which, in the illustrative embodiment, is a transmissive backlit liquid crystal display. However, image generator 74 could additionally be an emissive display or a reflective display, all of which are well known in the art.

Light rays of the image generated by image generator 74 next pass through an anti-reflective coated cover glass 120 which is joined with a left-hand circular polarizer 122 which is bonded to this cover glass. The opposite surface of circular polarizer 122 is bonded to a lens 124 having a 50/50 dielectric coating. Such dielectric coating allows light rays to be both transmitted through the lens and reflected by the lens. The left-hand polarized light X' transmitted through lens 124 contacts a cholesteric liquid crystal layer (CLC) 126 which is left-hand polarized, which is what gives efficient reflection of left-hand polarized light X', as illustrated at X". Fifty percent (50%) of light rays X" get efficiently reflected by the 50/50 beam splitter on lens 124 as right-hand circular polarized light X'". Right-hand polarized light X'" is transmitted by CLC layer 126 and passes through a right-hand circular polarizer 128 and an anti-reflective coated cover glass 130.

As can be seen by reference to FIG. 17, the optical configuration of lens 124 in combination with the left-hand and right-hand circular polarizers 122, 128 and cholesteric liquid crystal layer (CLC) 126, provide image magnification as well as collimate the image light in order to produce a very long focal distance image. Advantageously, this structure allows image portions from multiple image capture devices to be tiled into a unitary image. FIG. 17 illustrates an approach using a single image generator. Merging of multiple image portions would require additional combined image generator and optical correction systems. Although image generators 74 for each of the image portions are laterally spaced apart from each other, the amplification produced by combined image generator and optical correction system 106 causes the image portions to merge at their periphery. FIG. 17 illustrates an approach using a single image generator. Merging of multiple image portions would require additional combined image generators and optical correction systems. Other optical elements such as prisms, or other lenses, may be necessary to merge images to form a unitary image. Although the invention is illustrated with a combined image generator and optical correction system using cholesteric liquid crystal optical processing, other optical correction systems, as are known in the art, may be used. What is required is that the optical system generally collimates the light generated by the image generator and, preferably, provides amplification to the generated image.

In the illustrated embodiment, rear image 42, synthesized from the output of image capture devices 14, 16, has a lateral width verses vertical height aspect ratio that is between approximately 4:1 and 2:1. Most preferably, the aspect ratio of image 42 is 8:3. This allows a panoramic view rearwardly of the vehicle with an optimum information content while reducing display of irrelevant information. The aspect ratio of display 20 may be different from that of the displayed synthesized image 42. The remaining portion of the display, either above or below image 42, may be utilized to display images other than synthesized image 42. For example, the remaining portion of the display can be used to display auxiliary information such as one or more vehicle-operating parameters, such as vehicle speed indicia 56, heading indicia 54, or turn signal indicia 58. Alternatively, the remaining portion of the display can be a reconfigurable high-information content display area to selectively display various types of information. Such information may include incoming facsimile or pager information, phone numbers, and navigational aids including pull-up maps, route guidance information, global positioning system (GPS) data, intelligent vehicle highway system (IVHS) information, as well as radio and environmental system control settings, and the like. Display 20 is especially useful for displaying such alternative data. Because display 20 has a very long focal length, the driver may consult the alternative data by switching the gaze of the driver between forward field of view 70 and to display 20 which does not require extensive refocusing of the driver's eyes. This allows the driver to consult the alternative data quickly with reduced fatigue and distraction. The content of the auxiliary information displayed may be user-selectable by a keypad, trackball, or other input device on the dashboard, steering column, or other position readily accessible to the driver.

Although various camera devices may be utilized for image capture devices 14, 16, an electro-optic, pixilated imaging array, located in the focal plane of an optical system, is preferred. Such imaging array allows the number of pixels to be selected to meet the requirements of rearview vision system 12. The pixel requirements are related to the imaging aspect ratio of the respective image capture devices, which, in turn, are a function of the ratio of the vertical-to-horizontal field of view of the devices, as is well known in the art. In the illustrated embodiment, the imaging aspect ratio of side image capture devices 14 is 2:1 and the image aspect ratio of central image capture device 16 is variable down to 0.1:1. Such aspect ratio will produce images which will not typically match that of commercially available displays. A commercially available display may be used, however, by leaving a horizontal band of the display for displaying alpha-numeric data, such as portions of an instrument cluster, compass display, or the like, as illustrated in FIG. 3.

In the illustrated embodiment, image capture devices 14, 16 are CMOS imaging arrays of the type manufactured by VLSI Vision Ltd. of Edinburgh, Scotland, which are described in more detail in co-pending U.S. patent application Ser. No. 08/023,918 filed Feb. 26, 1993, now U.S. Pat. No. 5,550,677, the disclosure of which is hereby incorporated herein by reference. However, other pixilated focal plane image-array devices, which are sensitive to visible or invisible electromagnetic radiation, could be used. The devices could be sensitive to either color or monochromatic visible radiation or near or far infrared radiation of the type used in night-vision systems. Each image capture device could be a combination of different types of devices, such as one sensitive to visible radiation combined with one sensitive to infrared radiation. Examples of other devices known in the art include charge couple devices and the like.

Preferably, image capture devices 14 and 16 are all mounted at the same vertical height on vehicle 10, although compromise may be required in order to accommodate styling features of the vehicle. The horizontal aim of image capture devices 14 and 16 is preferably horizontal. However, the portion of the image displayed is preferably biased toward the downward portion of the captured image because significantly less useful information is obtained above the horizontal position of the image capture devices.

Each image-capturing device 14, 16 is controlled by appropriate supporting electronics (not shown) located in the vicinity of the imaging array such that, when operating power is supplied, either an analog or a digital data stream is generated on an output signal line supplied to image processor 18. The support electronics may be provided partially on the image chip and partially on associated electronic devices. For each exposure period, a value indicative of the quantity of light incident on each pixel of the imaging array during the exposure period is sequentially outputted in a predetermined sequence, typically row-by-row. The sequence may conform to video signal standards which support a direct view such that, when a scene is viewed by an image-capturing device, the image presented on a display represents directly the scene viewed by the image-capturing devices. However, when looking forward and observing a displayed image of a rearward scene, the driver will interpret the image as if it were a reflection of the scene as viewed through a mirror. Objects to the left and rearward of the vehicle, as viewed by the rearward-looking camera, are presented on the left-hand side of the display and vice versa. If this reversal is effected in image processor 18, it may be by the use of a data storage device, or buffer, capable of storing all of the pixel values from one exposure period. The data is read out of the data storage device in a reversed row sequence. Alternatively, the imaging array electronics could be constructed to provide the above-described reversal at the image-capturing device or at the display.

Data transmission between image capture devices 14, 16 and image processor 18 and/or between image processor 18 and display 20 may be by electrically conductive leads. The leads may comprise either a serial or parallel bus. Alternatively, the data transmission may be via plastic or glass fiber-optic cable or an RF link. It is possible, for particular applications, to eliminate image processor 18 and direct drive display 20 from image capture devices 14, 16 at the pixel level. This may be accomplished by providing an interface between the output of image capture device 14, 16 and display 20 which synchronously maps image pixels captured by the image capture device, or devices, to the display. This synchronous mapping may be accomplished by providing a one-to-one mapping in which each pixel measurement is communicated to the display. Alternatively, the interface may only transmit pixel data which represents changes in the captured image. This allows for a reduction in the communication bandwidth necessary to transmit data between the image capture device, or devices, and the display. This may be accomplished by encoding the pixel data which represents changes in the captured image with additional data which designates the position of the pixel or other relevant information. Communication between the image capture device, or devices, may be multiplexed.

The data streams from image-capturing devices 14, 16 are combined in image processor 18 and directly mapped to the pixel array of display 20. This process is repeated preferably at a rate of at least 30 times per second in order to present an essentially real time video image. The image captured by side image capture device 14 on the right side of the vehicle is presented in right image portion 46 and the image from side image capture device 14 on the left side of the vehicle is displayed on left image portion 44. The image from center image capture device 16 is displayed on central image portion 48. The three image portions 44-48 are presented in horizontal alignment and adjacent to each other. However, the composite image may be positioned at any desired vertical position in the display 20. It is also possible to display image portions 44-48 on separate image devices which are adjacent each other.

In vision system 12, side image capture devices 14 are positioned preferably at a forward longitudinal position on vehicle 10 and center image capture device 16 is positioned at a rearward longitudinal position on the vehicle. As best seen by reference to FIG. 7, this positioning creates a difference in the vertical angle between each side image capture device 14 and center image capture device 16 with respect to a fixed location P1 that is a distance D1 behind the vehicle. This difference in sensing angle will cause each side image capture device 14 to image an object located at P1 on a horizontal row of pixels that is different from the horizontal row of pixels that center image capture device 16 will image the same object. If the image is below the horizontal centerline of the image capture device, it will be imaged on a lower row of pixels by center image capture device 16 than the row of pixels it will be imaged by the side image capture devices 14, as illustrated in FIG. 7. This mismatch between horizontal pixel rows of the captured image is furthermore a function of the distance of the captured image from the rear of the vehicle. This can be understood by reference to FIG. 11 which presents a chart 90 having a first column 92 of pixel lines n1, measured from the array centerline, at which an object will be imaged by side image capture device 14 and a second column 94 of pixel lines n2, measured from the array vertical centerline, at which the same object will be imaged by center image capture device 16. The result is that an object, which is captured by both side and center image capture devices 14, 16, will be vertically disjointed at the boundary of the displayed image, if the object is captured by more than one image capture device. The amount of disjointment will be greater closer to the vehicle and less at further distances. If the object is elongated in the horizontal direction, such as earth's horizon, bridges, or cross-markings on highways, then the object will appear to be either broken or crooked.

In order to provide uniform display of laterally elongated images, a rearview vision system 12' is provided having a central image portion 48' which is processed differently from the image display portions 44' and 46' produced by the side image capture devices (FIG. 8). Central image portion 48' is reduced vertically, or compressed, by removing specified scan lines, or pixel rows, from the image captured by center image capture device 16 in a graduated fashion. The difference in the pixel line at which an object will be imaged by each of the side and center image capture devices is a function of the distance D of the object from the rear of the vehicle, with a greater variation occurring at shorter distances and the variation reducing to zero for infinite distances. Therefore, the compression of central image portion 48' is non-linear, with substantially no compression at the vertical center of the image and greater compression at greater distances above and below the vertical center point of the image. This is accomplished by removing specific lines from the center display in a graduated fashion with a greater number of lines removed further from the vertical center of the image. The removed lines may be merely discarded in order to vertically reduce the image. Alternatively, the data contained in the removed lines may be utilized to modify the value of adjacent pixels above and below the removed line in order to enhance the quality of the compressed image. Averaging, median filtering, or other such known techniques may also be used.

Each of right image portion 46' and left image portion 44' includes an upper portion 64 which extends above the compressed upper portion of the central image portion 48'. In the illustrated embodiment, upper portions 64 are deleted in order to present a uniform upper horizontal boundary for display 20'. In the illustrated embodiment, the mismatch between the lower horizontal boundary of central image portion 48' and each of the left and right image portions provides a dead space 66 which provides a visual prompt to the user of the approximate location of the rearward corners S of vehicle 10. This dead space 66 in the image displayed on display 20' approximates the footprint occupied by vehicle 10 when viewed from point C. This is particularly useful because it provides a visual indication to the driver that a vehicle passing vehicle 10, as viewed in either left image portion 44' or right image portion 46', is at least partially adjacent vehicle 10 if the image of the approaching vehicle is partially adjacent to dead space 66.

In an alternative embodiment, the vertical compression technique may be applied to only a lower vertical portion of central image portion 48'. In most driving situations, objects imaged by rearward-facing image capture devices above the horizon are at a long distance from the vehicle while those below the horizon get progressively closer to the vehicle in relation to the distance below the horizon in the displayed image. Therefore, compression of the upper vertical portion of the central image portion may be eliminated without significant reduction in performance.

Compression of the central image portion may also advantageously be provided horizontally, as well as vertically. Spatial separation of center image capture device 16 from side image capture devices 14 causes similar distortion, as that described above, in the horizontal direction. This effect is spherical in nature and would require a more complex corrective action, such as compressing the image based upon the removal of pixels from an approximation to concentric circles centered on the center of the imaging array, or other techniques which would be apparent to those skilled in the art.

Figure 10:
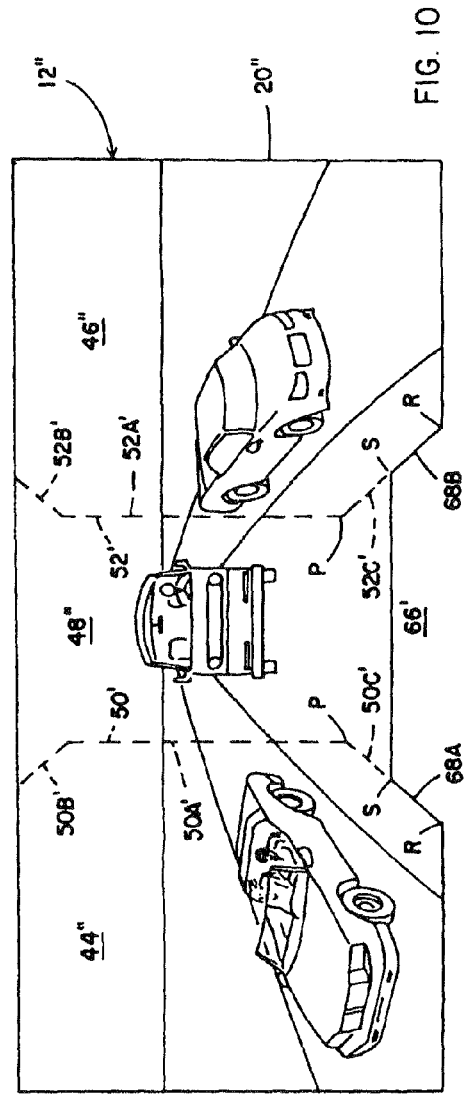
FIG. 10 is the same view as FIGS. 3 and 8 illustrating an alternative embodiment of the invention.

A rearview vision system 12" includes an image display 20" having a compressed central image portion 48" and left and right image portions 44" and 46", respectively (FIG. 10). A border 50' between left side image 44" and central image 48" includes a vertical central border portion 50a', an upper border portion 50b', and a lower border portion 50c'. Upper border portion 50b' and lower border portion 50c' diverge laterally outwardly, vertically away from central portion 50a'. A border 52' between central image portion 48" and right image portion 46" includes a central boundary portion 52a', an upper boundary portion 52b', and a lower boundary portion 52c'. Upper boundary portion 52b' and lower boundary portion 52c' diverge laterally outwardly vertically away from central portion 52a'. This creates an upper portion of central image portion 48" and a lower portion of central image portion 48" which extend beyond the center portion thereof. This configuration is based upon the realization that the surface of the road immediately behind the vehicle is captured by central image capture device 16. Likewise, the horizontal plane above the vehicle, which is symmetrical with the road surface, is captured by the center image capture device. This may be seen by referring to point P in FIG. 10, which illustrate the points where the effective radius 68 of the virtual image capture device intersects dead zones 30 and by referring to point S in FIG. 10 which illustrates the corners or the rear of the vehicle (S).

The image displayed on display 20" includes a dead space 66' having diverging lateral sides 68a, 68b. Diverging sides 68a and 68b are configured in order to extend in the direction of travel of vehicle 10 which is parallel to lane markings of a highway on which vehicle 10 is travelling. This further enhances the visual perception of the driver by providing a visual clue of the location of images appearing on display 20" with respect to the vehicle 10. Side portions 68a, 68b, in the illustrated embodiment, are natural extensions of lower boundary portions 50c' and 52c' and extend from point S on each respective side of the vehicle to point R, which represents the intersection of the lower extent of the vertical field of view 40 of each side image capture device 14 with the pavement (FIG. 7).

Rearview vision systems 12' and 12" utilize a displayed synthesized image which takes into account the use of perspective in enhancing the driver's understanding of what is occurring in the area surrounding the vehicle. The images produced on displays 20' and 20" effectively remove the vehicle bodywork and replace the bodywork with a vehicle footprint as would be viewed by virtual camera C. The image displayed on display 20" further includes perspective lines which further enhance the roll of perspective in the driver's understanding of what is occurring.

In order to further enhance the driver's understanding of what is occurring in the area surrounding the vehicle, a rearview vision system 12'" includes a display 20'" having image enhancements (FIG. 6). In the illustrative embodiment, such image enhancements include graphic overlays 70a, 70b which are hash marks intended to illustrate to the driver the anticipated path of movement of vehicle 10. In the illustrated embodiment, the anticipated vehicle motion is a function of the vehicle direction of travel as well as the rate of turn of the vehicle. The forward or rearward direction of vehicle travel is determined in response to the operator placing the gear selection device (not shown) in the reverse gear position. The degree of turn of the vehicle may be determined by monitoring the movement of the vehicle steering system, monitoring the output of an electronic compass, or monitoring the vehicle differential drive system. In the embodiment illustrated in FIG. 6, the configuration of graphic overlays 70a, 70b indicates that the vehicle is in reverse gear and that the wheels are turned in a manner that will cause the vehicle to travel toward the driver's side of the vehicle. If the wheels were turned in the opposite direction, graphic overlays 70a, 70b would curve clockwise toward the right as viewed in FIG. 6. If the vehicle's wheels were straight, graphic overlays 70a, 70b would be substantially straight converging lines. If the vehicle is not in reverse gear position, graphic overlays 70a, 70b are not presented. Other types of graphic overlays of the displayed image are comprehended by the invention.

Horizontal grid markings on the display may be provided to indicate distances behind the vehicle at particular markings. Such grid would allow the driver to judge the relative position of vehicles behind the equipped vehicle. In one embodiment, short horizontal lines are superimposed on the displayed image at regular rearward intervals in horizontal positions which correspond to the boundaries of the lane in which the vehicle is travelling. In order to avoid confusion when the vehicle is travelling in a curved path, from a lack of correspondence between the graphic overlay and the road, a signal indicative of the vehicle's rate of turn may be taken into account when generating the graphic overlay. In this manner, the distance indications may be moved laterally, with reduced horizontal separation, to correspond to the positions of the curved lane boundaries and vertically on the image to compensate for the difference between distances along a straight and curved path.

Another image enhancement is to alter the appearance of an object in a particular zone surrounding the vehicle in order to provide an indication, such as a warning, to the driver. As an example, a vehicle that is too close to the equipped vehicle for safe-lane change, may be displayed in a particular color, such as red, may flash, or otherwise be distinguishable from other images on the display. Preferably, the speed of the equipped vehicle 10, which may be obtained from known speed transducers, may be provided as an input to the rearview vision system in order to cause such warning to be a function of the vehicle speed which, in turn, affects the safe separation distance of vehicles. The operation of the turn signal may also be used to activate such highlighting of other road users or to modify the scope of the image displayed. In order to determine the distance of objects behind vehicle 10, a separate distance-measuring system may be used. Such separate system may include radar, ultrasonic sensing, infrared detection, and other known distance-measuring systems. Alternatively, stereoscopic distance-sensing capabilities of side image capture devices 14 may be utilized to determine the separation distance from trailing objects utilizing known techniques.

Thus, it is seen that the image displayed on display 20-20''' may be different under different circumstances. Such different circumstances may relate to the vehicle's direction of travel, speed, rate of turn, separation from adjacent objects, and the like.

Various other forms of image processing may be utilized with rearview vision system 12-12'''. Luminant and chrominant blending may be applied to the images captured by image capture devices 14, 16 in order to produce equality of the image data whereby the image portions appear as if they were produced by one image capture device. The dynamic range of the image capture devices may be extended in order to provide high quality images under all lighting conditions. Furthermore, individual pixel groups may be controlled in order to selectively compensate for bright or dark spots. For example, anti-blooming techniques may be applied for bright spots. Multiple exposure techniques may be applied to highlight dark areas. Image morphing and warping compensation techniques may additionally be applied. Resolution of the image capture devices and display may be selected in order to provide sufficient image quality for the particular application.

A heater may be applied to each image capture device in order to remove dew and frost that may collect on the optics of the device. Although, in the illustrative embodiment, the optical centerline of the camera coincides with the field of view, particular applications may result in the centerline of the camera pointing in a direction other than the centerline of the field of view. Although, in the illustrative embodiment, the image capture devices are fixed, it may be desirable to provide selective adjustability to the image capture devices or optical paths in particular applications. This is particularly desirable when the system is used on articulated vehicles where automated and coordinated camera aim may be utilized to maintain completeness of the synthesized image.

When operating the vehicle in the reverse direction, it may be desirable to provide additional data concerning the area surrounding the immediate rear of the vehicle. This may be accomplished by utilizing non-symmetrical optics for the center image capture device in order to provide a wide angle view at a lower portion of the field of view. Alternatively, a wide angle optical system could be utilized with the electronic system selectively correcting distortion of the captured image. Such system would provide a distortion-free image while obtaining more data, particularly in the area surrounding the back of the vehicle.

The invention additionally comprehends the use of more than three image capture devices. In addition to side image capture devices positioned at the front sides of the vehicle and a center image capture device positioned at the center rear of the vehicle, additional image capture devices may be useful at the rear corners of the vehicle in order to further eliminate blind spots. It may additionally be desirable to provide an additional center image capture device at a higher elevation in order to obtain data immediately behind the vehicle and thereby fill in the road surface detail immediately behind the vehicle. Such additional detail is particularly useful when operating the vehicle in the reverse direction. Of course, each of the image capture devices could be a combination of two or more image capture devices.

Although the present invention is illustrated as used in a rearview vision system, it may find utility in other applications. For example, the invention may be useful for providing security surveillance in an area where a building or other object obstructs the view of the area under surveillance. Additionally, the invention may find application in night-vision systems and the like. For example, the invention may be applied to forward-facing night-vision systems, or other vision enhancement systems such as may be used in adverse weather or atmospheric conditions such as fog, applied to provide an enhanced display of a synthesized image, which approximates a forward-facing view from a single virtual camera located rearwardly of the driver, taking advantage of the perspective features of the image.

A rearview vision system 150 is provided which, in addition to displaying a rear image on display 20 which is synthesized by image processor 18 from the output of image capture devices 14, 16, also supplies drive signals to an electrically operated optical device such as electro-optic mirror 152, an electro-optic window 154, or both. Even though a panoramic view rearward of the vehicle is displayed on display 20, it may be desired to provide the driver with a rearview mirror of the type which has conventionally been provided on vehicles. One such mirror is an electro-optic mirror, such as an electrochromic mirror, a liquid crystal mirror, or a solenoid-operated prismatic mirror and the like. Additionally, vehicles may be provided with electro-optic windows, such as sunroofs, rear windows, side windows, and the like, which change transmissivity in response to a drive signal to a partial light transmittance level. In U.S. patent application Ser. No. 08/023,918 filed Feb. 26, 1993, now U.S. Pat. No. 5,550,677, the disclosure of which is hereby incorporated herein by reference, a technique is disclosed for producing a drive signal for an electrically operated optical device, such as an electro-optic mirror or window, from the image captured by a rearward-facing array. Utilizing the techniques disclosed therein, image processor 18 produces a drive signal on line 156 in order to control the partial reflectance level of electro-optic mirror 152 and a drive signal on line 158 in order to control the partial light transmittance level of electro-optic window 154.

Figure 19:
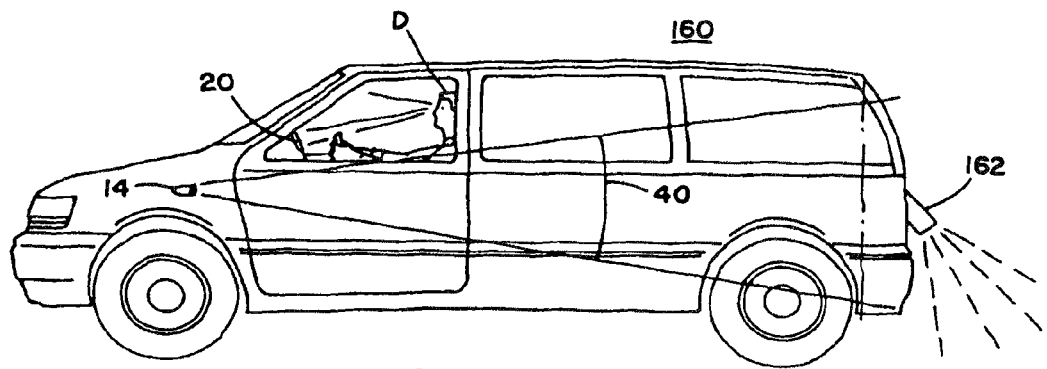
FIG. 19 is a side elevation similar to FIG. 2 of an alternative embodiment of the invention.
Figure 20:
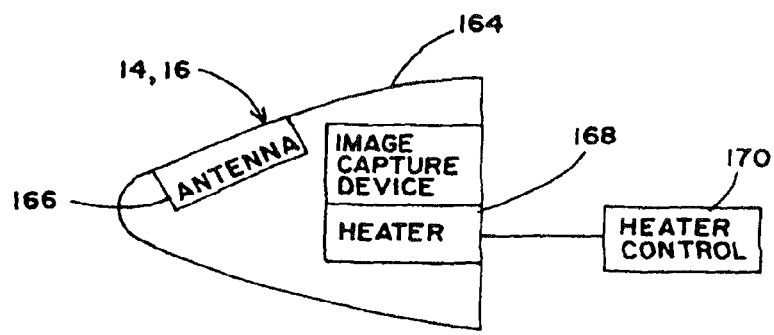
FIG. 20 is an enlarged side elevation of an image capture device with portions of the housing removed in order to reveal internal structure thereof.
Figure 21:
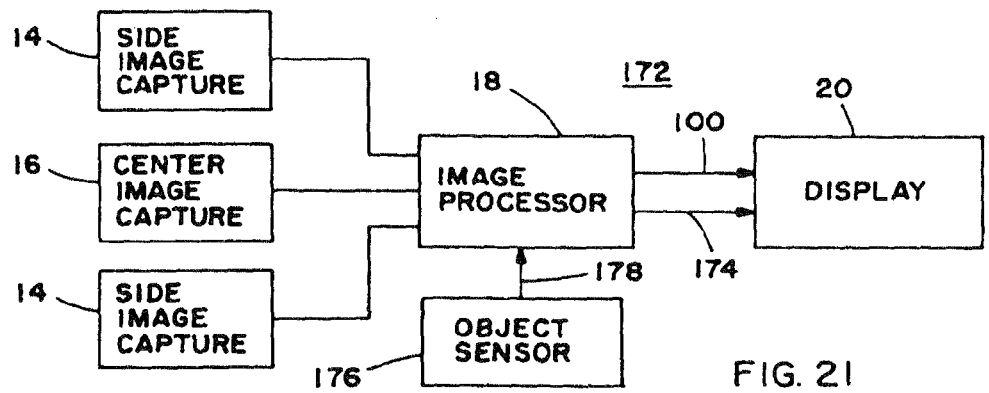
FIG. 21 is a block diagram similar to FIG. 5 of another alternative embodiment of the invention.

A rearview vision system 160 is provided which includes a near infrared illumination device 162 in order to enhance an image captured by image capture devices 14, 16 (FIG. 19). In the illustrated embodiment, infrared illumination device 162 illuminates an area immediately behind the vehicle. Preferably, the output of illumination device 162 has a greater near infrared light output than visible light output. This allows an enhanced image to be captured by the image capture device without increasing the visible light perceived by drivers surrounding the vehicle. Infrared illumination device 162 may be actuated in response to the vehicle being placed in reverse gear. This provides backup illumination which is greatly enhanced without having an increased effect on other drivers. Alternatively, infrared illumination devices may be positioned, for example, at other locations on the side or even the front of a vehicle in order to enhance the image captured by the image capture device or devices. This is especially useful in order to utilize rearview vision system 160 with a large truck, such as a trailer truck. This infrared illumination device may flood the area around the trailer with infrared light in order to enhance the image captured by the image capture device, or devices, without distracting other drivers.

Image capture device 14, 16 may include a housing 164 in which an antenna 166 is positioned. This provides a convenient and functional location for a receiving antenna, such as the type used with a global positioning system, cellular telephone, garage door opener, radar distance sensing device, and the like, as disclosed in patent application Ser. No. 08/569,851 filed by O'Farrell et al., now U.S. Pat. No. 5,971,552, the disclosure of which is hereby incorporated herein by reference. A heater 168 may be associated with the image capture device in order to stabilize the temperature of the device in low ambient temperature conditions. A similar heater may be supplied in display 20 in order to improve its performance in low ambient temperature conditions. A heater control 170 is provided in order to control the energization of heater 168 and, if utilized, the heater in the display. Heater control 170, preferably, energizes heater 168 prior to the vehicle being started. This allows the temperature of the image capture device to be elevated to a more desirable temperature prior to the driver operating the vehicle. This may be accomplished by heater control 170 being a proximity detector which detects a device carried by the driver as the driver approaches the vehicle. Alternatively, heater control 170 may be responsive to a signal produced by a remote keyless entry device concurrently with the doors being activated. Alternatively, heater control 170 may be responsive to the vehicle device being opened.

A rearview vision system 172 is provided which provides an output, generally referred to at 174, from image processor 18 to display 20. Output 174 provides an indication when an object bears a predetermined relationship to the vehicle. Such object may be of interest because the object is in a blind spot of the vehicle, may be tailgating the vehicle, or may be an object in front of the vehicle which the vehicle is too close to. Display 20 may respond to output 174 by highlighting the displayed vehicle, such as by displaying the vehicle in an artificial color, such as red, by flashing the image of the vehicle, or, otherwise, drawing the attention of the driver to the vehicle. Output 174 may be developed by image processor 18 from the outputs of image capture devices 14, 16. This may be accomplished by, for example, utilizing redundant image portions captured by the image capture devices, even though not displayed by display 20, in order to calculate relative position of the object with respect to the vehicle. Alternatively, an object sensor 176 may be provided in order to supply an output 178 indicative of a predetermined positional relationship of an object sensed by the object sensor with respect to the vehicle. In the illustrated embodiment, object sensor 176 may be a passive infrared sensor which senses the presence of an object in the vehicle's blind spot. Alternatively, object sensor 176 may be a distance-measuring device, such as an active infrared sensor, an ultrasonic sensor, a radar sensor, or the like. Such object sensor is especially useful in determining the separation distance between the vehicle and objects in front of the vehicle. Preferably, object sensor 176 has a sensing field of view that is substantially coincident with the field of view of one or more of the image capture devices 14, 16.

Figure 22:
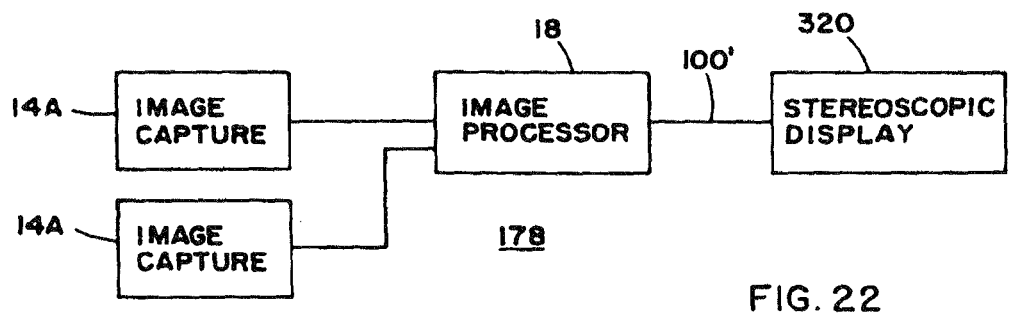
FIG. 22 is a block diagram similar to FIG. 5 of another alternative embodiment of the invention.
Figure 23:
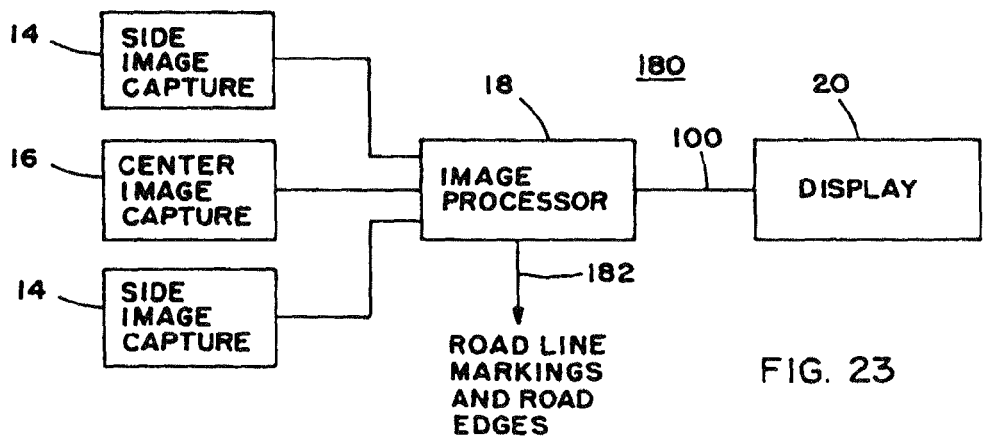
FIG. 23 is a block diagram similar to FIG. 5 of another alternative embodiment of the invention.
Figure 24:
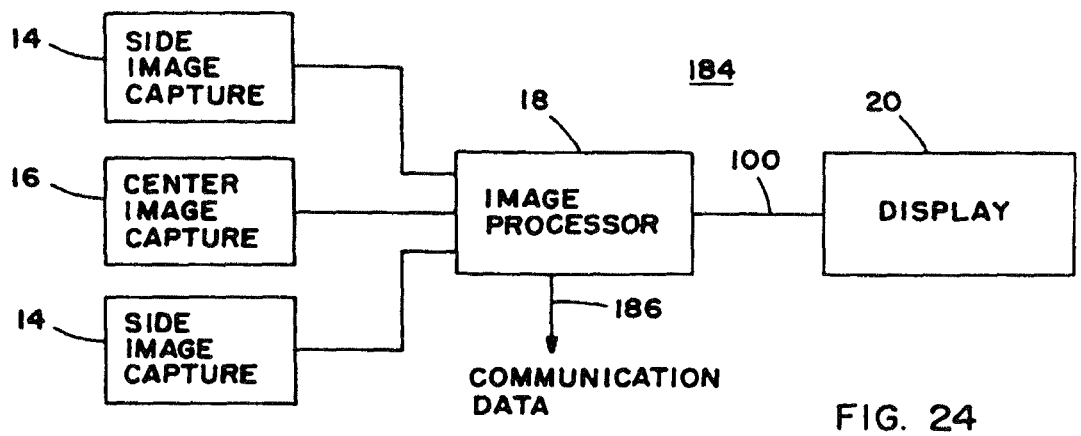
FIG. 24 is a block diagram similar to FIG. 5 of another alternative embodiment of the invention.

A rearview vision system 178 is provided which has the capability of displaying stereoscopic images rearward of the vehicle. Rearview vision system 178 includes at least one pair of image capture devices 14a, which are closely positioned on the vehicle and have overlapping fields of view. Because the image capture device pairs are closely positioned, they capture substantially the same image but from a slightly different angle. This allows image processor 18 to produce a video signal 100' with stereoscopic information. This signal is utilized by a stereoscopic display 320 in order to produce a stereoscopic image rearward of the vehicle. Such stereoscopic displays are known in the art. Although one pair of image capture devices are illustrated in FIG. 22, rearview vision system 178 may include multiple pairs of image capture devices. This allows a rear image to be synthesized from the multiple pairs of image capture devices in order produce a panoramic view rearward of the vehicle and stereoscopic image. Preferably, utilizing other aspects of the invention, the stereoscopic image is a rearward-facing view from a single location.

A rearview vision system 180 is provided which produces an indication 182 of road line markings. Indication 182 may also indicate road edges. Image processor 18 detects the road line markings and the road edges from the images captured by image capture devices 14, 16. This feature may be further enhanced by combining it with an infrared illumination device 162 in order to further illuminate areas behind and around the vehicle in order to enhance the image of the road line markings and the road edges. Indication 182 may be utilized by display 20 in order to provide an indication of the vehicle with respect to the road line markings and road edges. The indication may further be utilized by an indicator which indicates the relative position of the vehicle in its lane. Additionally, the indication may be utilized to determine erotic vehicle operation, such as may occur when the driver begins to fall asleep, in order to provide a suitable alarm, or the like.

A rearview vision system 184 is provided with capabilities for infrared communication with other vehicles and stationary beacons. Rearview vision system 184 produces a communication data output 186 which includes communication data decoded from infrared signals detected by image capture device or devices 14, 16. For example, suitable standards may be developed wherein vehicles are equipped with a pair of spaced apart infrared transmitters on a forward portion thereof. Image processor 18 may respond to the temporal and spatial patterns of infrared signals detected by image capture devices 14, 16 in order to determine the speed and distance and, thereby, the separation of the vehicles as well as the rate of change of separation of the vehicles. Such information may be communicated to the trailing vehicle by an infrared transmitter (not shown) in order to control the speed of the trailing vehicle. This feature provides adaptive cruise control in which the speed of the trailing vehicle is controlled according to separation distance with leading vehicles. This allows high-speed convoying between vehicles. The communication system may additionally provide for the identification of emergency vehicles, and the like, which may transmit a unique temporal and/or spatial pattern of an infrared signal. The IR communication signal may additionally be utilized to receive signals from stationary devices, such as location beacons and Intelligent Vehicle Highway System (IVHS) data. Because rearview vision system 184 has a field of view which extends generally rearwardly of the vehicle, the system provides the capability for sensing information after the vehicle has passed the beacon. This provides an adjunct to infrared communication systems having a field of view generally forward of, or to the side of, the vehicle.

Figure 25:
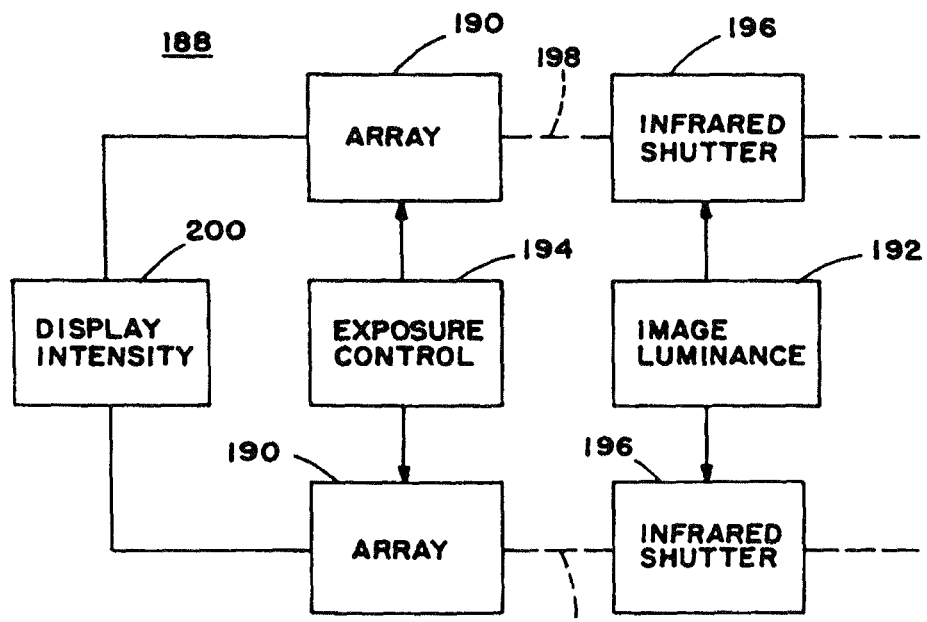
FIG. 25 is a block diagram of a rearview vision system having extended dynamic range capabilities.

A rearview vision system 188 is provided having extended dynamic range (FIG. 25). Rearview vision system 188 includes a pair of image capture devices 14 and/or 16, each of which has an image-sensing array 190. Each image capture device is capable of operating in either a color mode, in which a color image is displayed on display 20, or a monochrome mode, in which a monochrome image is displayed on display 20. System 188 includes an image luminance sensor 192 which senses the luminance level of images captured by image capture devices 14, 16. Image luminance sensor 192 may switch the image capture devices between the color mode and the monochrome mode such that, when the image luminance is sufficiently high, the image capture device, or devices, operate in a color mode. During low image luminance conditions, the image capture device, or devices, are operated in a monochromatic mode which does not require as much image luminance. This extends the dynamic range of the system. Rearview vision system 188 may additionally include an exposure control 194 which determines the exposure period for capturing each frame by arrays 190. In order to extend the dynamic range of system 188, exposure control 194 may produce exposure intervals for arrays 190 which vary in length from interval-to-interval. Thus, a series of normal exposure intervals may be occasionally supplanted by a longer exposure interval during which greater detail of the image may be captured. This enhanced image may then be combined with the image captured during the shorter intervals into a merged image of enhanced detail.

Rearview vision system 188 may additionally include a plurality of infrared shutters 196 which are in the optical paths 198 of arrays 190. Each infrared shutter 196 has at least one state in which infrared energy is generally not attenuated to array 190. In another state, the infrared shutter generally blocks infrared radiation from the array. The state of infrared shutters 196 is controlled by image luminance sensor 192. During periods of high image luminance, sensor 192 may switch the infrared shutters 196 to a state blocking near infrared radiation from arrays 190. However, during low image luminance conditions, sensor 198 may switch the infrared shutters 196 to a state in which the near infrared energy is transmitted to arrays 190. The addition of the near infrared radiation at low luminance levels enhances the image luminance sensed by arrays 190. In the illustrated embodiment, infrared shutters 196 are either electrochromic shutters or liquid crystal shutters, both of which are known in the art. Rearview vision system 188 additionally includes means for coordinating the image intensity received from multiple image capture devices and displayed on display 20. This allows a balance composite image to be displayed on the display. This may be provided by a display intensity control 200 which regulates the intensity of the output of both arrays 190 in order to produce color and luminance balancing between the multiple image capture devices. Instead of a separate display intensity control, a direct communication channel may be developed between the image capture devices in order to provide color and luminance balancing.

Each image pixel captured by image capture devices 14, 16 and displayed on display 20 has a resolution which affects the amount of image detail displayed. While it is desirable to have a high degree of detail of displayed image, the increase in image resolution produces a commensurate increase in system cost. While it is desirable to reduce system cost, this should not be achieved by sacrificing necessary detail in the displayed image. According to the invention, it has been determined that sufficient image detail may be obtained at a suitable system cost by having a pixel resolution in the range of between approximately 2 arc minutes and approximately 8 arc minutes. Preferably, system resolution is approximately 6 arc minutes.

It is known in the art to provide imaging array capture devices having mosaic filters which mask image radiation in order to produce pixels which respond respectively to red, green, and blue light. Because such known pixel filter masks do not adequately absorb near infrared radiation, it is known to supply infrared filters in order to block infrared radiation from the pixels so that the pixels respond to only the designed radiation band. However, such additional filters have undesirable characteristics including costs. It has been discovered that a pixel filter mask may be made responsive to red, green, or blue light while filtering out near infrared by adding appropriate dyes to the dyes making up the filter mask.

The heater supplied with each image capture device may include a transparent conductive coating applied to a window covering the device lens. Alternative heater constructions include ITO or a series of fine wire mesh. This provides protection of the lens of the image capture device from physical harm while allowing moisture and frost to be removed from the window.

Various manipulation techniques may be applied to image capture devices 14, 16. For example, when the invention is applied to semi-tractor/trailer combinations, the image capture devices may be motorized and responsive to signals representing the relative position of the trailer and the cab in order to produce full panoramic view during various maneuvers of the vehicle. For example, as the vehicle turns, which may cause the trailer to otherwise block the image captured by a side image capture device, the image capture device may pivot to a different panoramic view which is not blocked by the trailer. Additionally, the panoramic view sensed by the image capture device may be different when the trailer is attached than when the trailer is not attached. In a similar fashion, rearward-mounted image capture device 16 may be motorized to move vertically upwardly and downwardly between a first position when the vehicle is moving in a forward direction and a second position when the vehicle is in reverse gear. In the second position, the motorized camera is directed more downwardly in order to capture images closer to the rear of the vehicle which may be contacted by the vehicle. Image capture devices 14, 16 may be supplied with electrical opto-mechanical zoom devices as well as vibration isolation and compensation stabilizing devices.

Image processor 18 may provide an input to a control for the intensity of the brake lights, turn signals, and the like for the vehicle. In this manner, the image processor may control the intensity of such lights based upon ambient lighting conditions. This allows the intensity of the rearward directed lights to be less distracting for following vehicles.

Additionally, the present invention may be utilized for providing guidance for a tractor/trailer or like vehicle backing to a loading dock. Additionally, the invention may provide guidance for proper alignment of the trailer and tractor which are being joined by backing of the tractor. The present invention may additionally provide accident monitoring by capturing a predetermined continuous stream of images, such as, for example, 15 seconds. This running store of image may be frozen upon impact of the vehicle, in order to record events leading up to the impact, or may be stopped by a manual input. Furthermore, the invention may be utilized to alert the driver to an impending rear-end collision. The vehicle may respond to such indication by deploying an appropriate device, such as a smart headrest or the like.

Thus, it is seen that the present invention enhances the relationship between the driver's primary view and the image presented on the rearview vision system. This is accomplished in a manner which provides ease of interpretation while avoiding confusion so that the driver does not have to concentrate or look closely at the image. In this manner, information presented on the display is naturally assimilated. This is accomplished while reducing blind spots so that other vehicles or objects of interest to the driver will likely be displayed to the driver. Additionally, the use of perspective allows distances to be more accurately determined.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A multi-camera vision system for a vehicle, said vehicular multi-camera vision system comprising:
    at least three image capture devices disposed at a vehicle equipped with said vehicular multi-camera vision system;
    said at least three image capture devices comprising a first image capture device disposed at a driver-side portion of the equipped vehicle at a first location;
    said at least three image capture devices comprising a second image capture device disposed at a passenger-side portion of the equipped vehicle at a second location;
    said at least three image capture devices comprising a third image capture device disposed at a rear portion of the equipped vehicle at a third location;
    wherein said first image capture device has a first field of view exterior of the equipped vehicle;
    wherein said second image capture device has a second field of view exterior of the equipped vehicle;
    wherein said third image capture device has a third field of view exterior of the equipped vehicle;
    wherein said first field of view of said first image capture device overlaps with said third field of view of said third image capture device defining a first overlap zone;
    wherein said second field of view of said second image capture device overlaps with said third field of view of said third image capture device defining a second overlap zone;
    wherein said first image capture device captures first image data;
    wherein said second image capture device captures second image data;
    wherein said third image capture device captures third image data;
    an image processor;
    wherein first image data captured by said first image capture device is received at said image processor via at least one of an analog data stream and a digital data stream;
    wherein second image data captured by said second image capture device is received at said image processor via at least one of an analog data stream and a digital data stream;
    wherein third image data captured by said third image capture device is received at said image processor via at least one of an analog data stream and a digital data stream;
    wherein, responsive to processing by said image processor of received image data, a synthesized image is generated without duplication of objects present in said first overlap zone and in said second overlap zone and wherein said synthesized image approximates a view as would be seen by a virtual camera at a single location exterior of the equipped vehicle; and
    wherein said synthesized image is displayed by a single display screen of a reconfigurable display device that is viewable by a driver of the equipped vehicle when normally operating the equipped vehicle.

2. The vehicular multi-camera vision system of claim 1, wherein said single location is forward of the equipped vehicle.

3. The vehicular multi-camera vision system of claim 1, wherein first image data captured by said first image capture device is received at said image processor via a digital data stream and wherein second image data captured by said second image capture device is received at said image processor via a digital data stream and wherein third image data captured by said third image capture device is received at said image processor via a digital data stream.

4. The vehicular multi-camera vision system of claim 1, wherein image data transmission from said first, second and third image capture devices to said image processor is by electrically conductive leads over a vehicle communication bus.

5. The vehicular multi-camera vision system of claim 4, wherein said vehicle communication bus comprises a serial bus.

6. The vehicular multi-camera vision system of claim 4, wherein said vehicle communication bus comprises a parallel bus.

7. The vehicular multi-camera vision system of claim 1, wherein the image displayed by said display screen includes a visual indication of the location of the equipped vehicle in said view.

8. The rearview multi-camera vision system of claim 7, wherein said visual indication approximates the footprint occupied by the equipped vehicle.

9. The vehicular multi-camera vision system of claim 7, wherein said visual indication comprises an outline of an area substantially occupied by the equipped vehicle.

10. The vehicular multi-camera vision system of claim 1, wherein said first image capture device is disposed at the equipped vehicle at substantially the same height relative to ground as is said second image capture device.

11. The vehicular multi-camera vision system of claim 10, wherein said first location where said first image capture device is disposed at the driver-side of the equipped vehicle is a first distance forward of where the driver sits when operating the equipped vehicle and wherein said second location where said second image capture device is disposed at the passenger-side of the equipped vehicle is a second distance forward of where the driver sits when operating the equipped vehicle.

12. The vehicular multi-camera vision system of claim 11, wherein said first distance is substantially the same as said second distance.

13. The vehicular multi-camera vision system of claim 11, wherein said third image capture device is at a height relative to ground that is lower than the height relative to ground of said first and second image capture devices, and wherein said third location is a third distance rearward of where the driver sits when operating the equipped vehicle and wherein said third distance is larger than either of said first and second distances.

14. The vehicular multi-camera vision system of claim 1, wherein said at least three image capture devices have the principal axis of their respective field of view aimed along non-parallel axes.

15. The vehicular multi-camera vision system of claim 1, wherein the image displayed by said display screen approximates a rearward-facing view from a single location exterior of the equipped vehicle.

16. The vehicular multi-camera vision system of claim 15, wherein said single location is forward of the equipped vehicle.

17. The vehicular multi-camera vision system of claim 1, wherein a fourth image capture device is disposed at a front portion of the equipped vehicle.

18. The vehicular multi-camera vision system of claim 17, wherein said single location is rearward of the equipped vehicle.

19. The vehicular multi-camera vision system of claim 1, wherein each of said at least three image capture devices comprises a CMOS imaging array.

20. The vehicular multi-camera vision system of claim 1, wherein the image displayed by said display screen comprises a graphic overlay.

21. The vehicular multi-camera vision system of claim 20, wherein said graphic overlay comprises indicia of the anticipated path of travel of the equipped vehicle.

22. The vehicular multi-camera vision system of claim 20, wherein said graphic overlay comprises indicia indicating distance to objects exterior the equipped vehicle.

23. The vehicular multi-camera vision system of claim 1, wherein the image displayed by said display screen comprises enhancements that assist visually distinguishing objects close to the equipped vehicle.

24. The vehicular multi-camera vision system of claim 1, wherein the image displayed by said display screen comprises indicia and wherein said indicia responds to at least one of the vehicle's steering system, the vehicle's differential system and a compass.

25. The vehicular multi-camera vision system of claim 1, wherein at least one of color and flashing is used to draw the driver's attention to a potential hazard present in the image displayed by said display screen.

26. The vehicular multi-camera vision system of claim 1, wherein the image displayed by said display screen comprises a graphic overlay that includes indicia of the anticipated path of travel of the equipped vehicle and wherein said graphic overlay is disabled when the vehicle's gear actuator is not in reverse gear.

27. The vehicular multi-camera vision system of claim 1, wherein the display luminance of said display screen of said reconfigurable display device is variable responsive to a sensing of an ambient light level.

28. The vehicular multi-camera vision system of claim 1, wherein the display luminance of said display screen of said reconfigurable display device is variable responsive to at least one of (i) a vehicle headlight activation control, (ii) an ambient light sensor and (iii) an indication of ambient light level detected by at least one of said first, second and third image capture devices.

29. The vehicular multi-camera vision system of claim 1, wherein said display screen of said reconfigurable display device is operable to display at least one of (i) pager information, (ii) a telephone number listing, (iii) global positioning system data, (iv) a map, (v) route guidance information, (vi) intelligent vehicle highway system information, (vii) a vehicle radio control setting, (viii) a vehicle environmental system setting, (ix) vehicle speed, (x) vehicle heading, (xi) turn signal indicators and (xii) a radio setting.

30. The vehicular multi-camera vision system of claim 1, wherein content displayed by said display screen of said reconfigurable display device is user-selectable.

31. The vehicular multi-camera vision system of claim 1, wherein content displayed by said display screen of said reconfigurable display device is user-selectable via at least one of a keypad and a trackball.

32. The vehicular multi-camera vision system of claim 1, wherein content displayed by said display screen of said reconfigurable display device is user-selectable via an input device located at a steering column of the equipped vehicle or at a dashboard of the equipped vehicle.

33. The vehicular multi-camera vision system of claim 1, wherein said reconfigurable display device comprises a flat-panel display device.

34. The vehicular multi-camera vision system of claim 33, wherein said flat-panel display device comprises a back-lit liquid crystal display device.

35. The vehicular multi-camera vision system of claim 33, wherein said flat-panel display device comprises a light-emitting diode display device.

36. The vehicular multi-camera vision system of claim 33, wherein said flat-panel display device comprises a plasma display device.

37. The vehicular multi-camera vision system of claim 33, wherein said flat-panel display device is mounted at a dashboard of the equipped vehicle.

38. The vehicular multi-camera vision system of claim 33, wherein said flat-panel display device is mounted at a facia of the equipped vehicle.

39. The vehicular multi-camera vision system of claim 33, wherein each of said at least three image capture devices comprises an array of photosensing pixels and wherein a mosaic spectral filter masks incident radiation in order to produce pixels which respond respectively to red, green and blue light.

40. The vehicular multi-camera vision system of claim 33, wherein each of said at least three image capture devices comprises an array of photosensing pixels and comprises filtering to least one of (a) at least partially block near infrared radiation from pixels of said array and (b) at least partially block infrared radiation from pixels of said array.

41. The vehicular multi-camera vision system of claim 1, wherein at least one of (a) said vehicular multi-camera vision system provides guidance when backing the equipped vehicle into a loading dock, (b) said vehicular multi-camera vision system provides guidance when backing the equipped vehicle with a trailer attached thereto, (c) said vehicular multi-camera vision system provides accident monitoring, (d) said vehicular multi-camera vision system is operable to alert the driver of the equipped vehicle to an impending rear-end collision and (e) said vehicular multi-camera vision system is operable to alert the driver of the equipped vehicle to an impending rear-end collision and to deploy a smart headrest in such an event.

42. The vehicular multi-camera vision system of claim 1, wherein said first field of view said first image capture device is bounded by the side of the equipped vehicle it is disposed at and extends outwards therefrom.

43. The vehicular multi-camera vision system of claim 1, wherein said second field of view said second image capture device is bounded by the side of the equipped vehicle it is disposed at and extends outwards therefrom.

44. The vehicular multi-camera vision system of claim 1, wherein said display device comprises a circular polarizer.

45. The vehicular multi-camera vision system of claim 1, wherein the image displayed by said display screen comprises a focal length that is substantially the depth of the field of the driver viewing objects beyond said equipped vehicle.

46. The vehicular multi-camera vision system of claim 1, wherein said synthesized image displayed by said display screen approximates a panoramic view as would be viewed from a single virtual camera located exterior the equipped vehicle.

47. The vehicular multi-camera vision system of claim 1, wherein said synthesized image displayed by said display screen approximates a substantially seamless panoramic view as would be viewed from a single virtual camera located exterior the equipped vehicle.

48. The vehicular multi-camera vision system of claim 1, wherein said synthesized image displayed by said display screen approximates a substantially seamless view as would be viewed from a single virtual camera located exterior the equipped vehicle.

49. A multi-camera vision system for a vehicle, said vehicular multi-camera vision system comprising:

at least three image capture devices disposed at a vehicle equipped with said vehicular multi-camera vision system;

said at least three image capture devices comprising a first image capture device disposed at a driver-side portion of the equipped vehicle at a first location;

said at least three image capture devices comprising a second image capture device disposed at a passenger-side portion of the equipped vehicle at a second location;

said at least three image capture devices comprising a third image capture device disposed at a rear portion of the equipped vehicle at a third location;

wherein said first image capture device has a first field of view exterior of the equipped vehicle;

wherein said second image capture device has a second field of view exterior of the equipped vehicle;

wherein said third image capture device has a third field of view exterior of the equipped vehicle;

wherein said first field of view of said first image capture device overlaps with said third field of view of said third image capture device defining a first overlap zone;

wherein said second field of view of said second image capture device overlaps with said third field of view of said third image capture device defining a second overlap zone;

wherein said first image capture device captures first image data;

wherein said second image capture device captures second image data;

wherein said third image capture device captures second image data;

wherein each of said at least three image capture devices comprises a CMOS imaging array;

wherein said first image capture device is disposed at the equipped vehicle at substantially the same height relative to ground as is said second image capture device;

wherein said third vehicular camera disposed at the rear of the equipped vehicle is operable as a backup camera;

an image processor;

wherein first image data captured by said first image capture device is received at said image processor;

wherein second image data captured by said second image capture device is received at said image processor;

wherein third image data captured by said third image capture device is received at said image processor;

wherein, responsive to processing by said image processor of received image data, a synthesized image is generated without duplication of objects present in said first overlap zone and in said second overlap zone and wherein said synthesized image approximates a view as would be seen by a virtual camera at a single location exterior of the equipped vehicle;

wherein said synthesized image is displayed by a single display screen of a reconfigurable display device that is viewable by a driver of the equipped vehicle when normally operating the equipped vehicle; and wherein at least one of (a) said synthesized image displayed by said display screen approximates a panoramic view as would be viewed from a single virtual camera located exterior the equipped vehicle, (b) said synthesized image displayed by said display screen approximates a substantially seamless panoramic view as would be viewed from a single virtual camera located exterior the equipped vehicle and (c) said synthesized image displayed by said display screen approximates a substantially seamless view as would be viewed from a single virtual camera located exterior the equipped vehicle.

50. The vehicular multi-camera vision system of claim 49, wherein first image data captured by said first image capture device is received at said image processor via a digital data stream and wherein second image data captured by said second image capture device is received at said image processor via a digital data stream and wherein third image data captured by said third image capture device is received at said image processor via a digital data stream.

51. The vehicular multi-camera vision system of claim 49, wherein image data transmission from said first, second and third image capture devices to said image processor is by electrically conductive leads over a vehicle communication bus.

52. The vehicular multi-camera vision system of claim 49, wherein the image displayed by said display screen includes a visual indication of the location of the equipped vehicle in said view and wherein at least one of (a) said visual indication approximates the footprint occupied by the equipped vehicle and (b) wherein said visual indication comprises an outline of an area substantially occupied by the equipped vehicle.

53. The vehicular multi-camera vision system of claim 49, wherein said first location where said first image capture device is disposed at the driver-side of the equipped vehicle is a first distance forward of where the driver sits when operating the equipped vehicle and wherein said second location where said second image capture device is disposed at the passenger-side of the equipped vehicle is a second distance forward of where the driver sits when operating the equipped vehicle, and wherein said first distance is substantially the same as said second distance, and wherein said third image capture device is at a height relative to ground that is lower than the height relative to ground of said first and second image capture devices, and wherein said third location is a third distance rearward of where the driver sits when operating the equipped vehicle and wherein said third distance is larger than either of said first and second distances.

54. The vehicular multi-camera vision system of claim 49, wherein said at least three image capture devices have the principal axis of their respective field of view aimed along non-parallel axes.

55. The vehicular multi-camera vision system of claim 49, wherein the image displayed by said display screen comprises a graphic overlay and wherein at least one of (i) said graphic overlay comprises indicia of the anticipated path of travel of the equipped vehicle and (ii) said graphic overlay comprises indicia indicating distance to objects exterior the equipped vehicle.

56. The vehicular multi-camera vision system of claim 49, wherein at least one of (a) the image displayed by said display screen comprises enhancements that assist visually distinguishing objects close to the equipped vehicle, (b) the image displayed by said display screen comprises indicia and wherein said indicia responds to at least one of the vehicle's steering system, the vehicle's differential system and a compass, (c) at least one of color and flashing is used to draw the driver's attention to a potential hazard present in the image displayed by said display screen and (d) the image displayed by said display screen comprises a graphic overlay that includes indicia of the anticipated path of travel of the equipped vehicle and wherein said graphic overlay is disabled when the vehicle's gear actuator is not in reverse gear.

57. The vehicular multi-camera vision system of claim 49, wherein at least one of (a) the display luminance of said display screen of said reconfigurable display device is variable responsive to a sensing of an ambient light level and (b) the display luminance of said display screen of said reconfigurable display device is variable responsive to at least one of (i) a vehicle headlight activation control, (ii) an ambient light sensor and (iii) an indication of ambient light level detected by at least one of said first, second and third image capture devices.

58. The vehicular multi-camera vision system of claim 49, wherein at least one of (a) said display screen of said reconfigurable display device is operable to display at least one of (i) pager information, (ii) a telephone number listing, (iii) global positioning system data, (iv) a map, (v) route guidance information, (vi) intelligent vehicle highway system information, (vii) a vehicle radio control setting, (viii) a vehicle environmental system setting, (ix) vehicle speed, (x) vehicle heading, (xi) turn signal indicators and (xii) a radio setting, (b) content displayed by said display screen of said reconfigurable display device is user-selectable, (c) content displayed by said display screen of said reconfigurable display device is user-selectable via at least one of a keypad and a trackball, and (d) content displayed by said display screen of said reconfigurable display device is user-selectable via an input device located at a steering column of the equipped vehicle or at a dashboard of the equipped vehicle.

59. The vehicular multi-camera vision system of claim 49, wherein at least one of (a) said reconfigurable display device comprises a flat-panel display device, (b) said reconfigurable display device comprises a flat-panel display device and wherein said flat-panel display device comprises a back-lit liquid crystal display device, (c) said reconfigurable display device comprises a flat-panel display device and wherein said flat-panel display device comprises a plasma display device, (d) said reconfigurable display device comprises a flat-panel display device and wherein said flat-panel display device comprises a light-emitting diode display device, (e) said reconfigurable display device comprises a flat-panel display device and wherein said flat-panel display device is mounted at a dashboard of the equipped vehicle and (f) said reconfigurable display device comprises a flat-panel display device and wherein said flat-panel display device is mounted at a facia of the equipped vehicle.

60. The vehicular multi-camera vision system of claim 49, wherein at least one of (a) each of said at least three image capture devices comprises an array of photosensing pixels and wherein a mosaic spectral filter masks incident radiation in order to produce pixels which respond respectively to red, green and blue light and (b) each of said at least three image capture devices comprises an array of photosensing pixels and comprises filtering to least one of (i) at least partially block near infrared radiation from pixels of said array and (ii) at least partially block infrared radiation from pixels of said array.

61. The vehicular multi-camera vision system of claim 49, wherein at least one of (a) said vehicular multi-camera vision system provides guidance when backing the equipped vehicle into a loading dock, (b) said vehicular multi-camera vision system provides guidance when backing the equipped vehicle with a trailer attached thereto, (c) said vehicular multi-camera vision system provides accident monitoring, (d) said vehicular multi-camera vision system is operable to alert the driver of the equipped vehicle to an impending rear-end collision and (e) said vehicular multi-camera vision system is operable to alert the driver of the equipped vehicle to an impending rear-end collision and to deploy a smart headrest in such an event.

62. The vehicular multi-camera vision system of claim 49, wherein said first field of view said first image capture device is bounded by the side of the equipped vehicle it is disposed at and extends outwards therefrom and wherein said second field of view said second image capture device is bounded by the side of the equipped vehicle it is disposed at and extends outwards therefrom.

63. The vehicular multi-camera vision system of claim 49, wherein said display device comprises a circular polarizer.

64. The vehicular multi-camera vision system of claim 49, wherein at least one of (a) said synthesized image displayed by said display screen approximates a panoramic view as would be viewed from a single virtual camera located exterior the equipped vehicle, (b) said synthesized image displayed by said display screen approximates a substantially seamless panoramic view as would be viewed from a single virtual camera located exterior the equipped vehicle and (c) said synthesized image displayed by said display screen approximates a substantially seamless view as would be viewed from a single virtual camera located exterior the equipped vehicle.

65. A multi-camera vision system for a vehicle, said vehicular multi-camera vision system comprising:
- at least three image capture devices disposed at a vehicle equipped with said vehicular multi-camera vision system;
- said at least three image capture devices comprising a first image capture device disposed at a driver-side portion of the equipped vehicle at a first location;
- said at least three image capture devices comprising a second image capture device disposed at a passenger-side portion of the equipped vehicle at a second location;
- said at least three image capture devices comprising a third image capture device disposed at a rear portion of the equipped vehicle at a third location;
- wherein said first image capture device has a first field of view exterior of the equipped vehicle;
- wherein said second image capture device has a second field of view exterior of the equipped vehicle;
- wherein said third image capture device has a third field of view exterior of the equipped vehicle;
- wherein said first field of view of said first image capture device overlaps with said third field of view of said third image capture device defining a first overlap zone;
- wherein said second field of view of said second image capture device overlaps with said third field of view of said third image capture device defining a second overlap zone;
- wherein said first image capture device captures first image data;
- wherein said second image capture device captures second image data;
- wherein said third image capture device captures second image data;
- wherein each of said at least three image capture devices comprises a CMOS imaging array;
- wherein said third vehicular camera disposed at the rear of the equipped vehicle is operable as a backup camera;
- an image processor;
- wherein first image data captured by said first image capture device is received at said image processor;
- wherein second image data captured by said second image capture device is received at said image processor;
- wherein third image data captured by said third image capture device is received at said image processor;
- wherein, responsive to processing by said image processor of received image data, a synthesized image is generated without duplication of objects present in said first overlap zone and in said second overlap zone and wherein said synthesized image approximates a view as would be seen by a virtual camera at a single location exterior of the equipped vehicle; and
- wherein said synthesized image is displayed by a single display screen of a reconfigurable display device that is viewable by a driver of the equipped vehicle when normally operating the equipped vehicle.

66. The vehicular multi-camera vision system of claim 65, wherein at least one of (a) first image data captured by said first image capture device is received at said image processor via a digital data stream and wherein second image data captured by said second image capture device is received at said image processor via a digital data stream and wherein third image data captured by said third image capture device is received at said image processor via a digital data stream and (b) image data transmission from said first, second and third image capture devices to said image processor is by electrically conductive leads over a vehicle communication bus.

67. The vehicular multi-camera vision system of claim 65, wherein the image displayed by said display screen includes a visual indication of the location of the equipped vehicle in said view and wherein at least one of (a) said visual indication approximates the footprint occupied by the equipped vehicle and (b) wherein said visual indication comprises an outline of an area substantially occupied by the equipped vehicle.

68. The vehicular multi-camera vision system of claim 65, wherein said first image capture device is disposed at the equipped vehicle at substantially the same height relative to ground as is said second image capture device, and wherein said first location where said first image capture device is disposed at the driver-side of the equipped vehicle is a first distance forward of where the driver sits when operating the equipped vehicle and wherein said second location where said second image capture device is disposed at the passenger-side of the equipped vehicle is a second distance forward of where the driver sits when operating the equipped vehicle, and wherein said first distance is substantially the same as said second distance, and wherein said third image capture device is at a height relative to ground that is lower than the height relative to ground of said first and second image capture devices, and wherein said third location is a third distance rearward of where the driver sits when operating the equipped vehicle and wherein said third distance is larger than either of said first and second distances.

69. The vehicular multi-camera vision system of claim 65, wherein at least one of (a) said at least three image capture devices have the principal axis of their respective field of view aimed along non-parallel axes and (b) said display device comprises a circular polarizer.

70. The vehicular multi-camera vision system of claim 65, wherein the image displayed by said display screen comprises a graphic overlay and wherein at least one of (i) said graphic overlay comprises indicia of the anticipated path of travel of the equipped vehicle and (ii) said graphic overlay comprises indicia indicating distance to objects exterior the equipped vehicle.

71. The vehicular multi-camera vision system of claim 65, wherein at least one of (a) the image displayed by said display screen comprises enhancements that assist visually distinguishing objects close to the equipped vehicle, (b) the image displayed by said display screen comprises indicia and wherein said indicia responds to at least one of the vehicle's steering system, the vehicle's differential system and a compass, (c) at least one of color and flashing is used to draw the driver's attention to a potential hazard present in the image displayed by said display screen and (d) the image displayed by said display screen comprises a graphic overlay that includes indicia of the anticipated path of travel of the equipped vehicle and wherein said graphic overlay is disabled when the vehicle's gear actuator is not in reverse gear.

72. The vehicular multi-camera vision system of claim 65, wherein at least one of (a) the display luminance of said display screen of said reconfigurable display device is variable responsive to a sensing of an ambient light level and (b) the display luminance of said display screen of said reconfigurable display device is variable responsive to at least one of (i) a vehicle headlight activation control, (ii) an ambient light sensor and (iii) an indication of ambient light level detected by at least one of said first, second and third image capture devices.

73. The vehicular multi-camera vision system of claim 65, wherein at least one of (a) said display screen of said reconfigurable display device is operable to display at least one of (i) pager information, (ii) a telephone number listing, (iii) global positioning system data, (iv) a map, (v) route guidance information, (vi) intelligent vehicle highway system information, (vii) a vehicle radio control setting, (viii) a vehicle environmental system setting, (ix) vehicle speed, (x) vehicle heading, (xi) turn signal indicators and (xii) a radio setting, (b) content displayed by said display screen of said reconfigurable display device is user-selectable, (c) content displayed by said display screen of said reconfigurable display device is user-selectable via at least one of a keypad and a trackball, (d) content displayed by said display screen of said reconfigurable display device is user-selectable via an input device located at a steering column of the equipped vehicle or at a dashboard of the equipped vehicle, (e) said reconfigurable display device comprises a flat-panel display device, (f) said reconfigurable display device comprises a flat-panel display device and wherein said flat-panel display device comprises a back-lit liquid crystal display device, (g) said reconfigurable display device comprises a flat-panel display device and wherein said flat-panel display device comprises a plasma display device, (h) said reconfigurable display device comprises a flat-panel display device and wherein said flat-panel display device comprises a light-emitting diode display device, (i) said reconfigurable display device comprises a flat-panel display device and wherein said flat-panel display device is mounted at a dashboard of the equipped vehicle and (j) said reconfigurable display device comprises a flat-panel display device and wherein said flat-panel display device is mounted at a facia of the equipped vehicle.

74. The vehicular multi-camera vision system of claim 65, wherein at least one of (a) each of said at least three image capture devices comprises an array of photosensing pixels and wherein a mosaic spectral filter masks incident radiation in order to produce pixels which respond respectively to red, green and blue light and (b) each of said at least three image capture devices comprises an array of photosensing pixels and comprises filtering to least one of (i) at least partially block near infrared radiation from pixels of said array and (ii) at least partially block infrared radiation from pixels of said array.

75. The vehicular multi-camera vision system of claim 65, wherein at least one of (a) said synthesized image displayed by said display screen approximates a panoramic view as would be viewed from a single virtual camera located exterior the equipped vehicle, (b) said synthesized image displayed by said display screen approximates a substantially seamless panoramic view as would be viewed from a single virtual camera located exterior the equipped vehicle and (c) said synthesized image displayed by said display screen approximates a substantially seamless view as would be viewed from a single virtual camera located exterior the equipped vehicle.

76. The vehicular multi-camera vision system of claim 65, wherein at least one of (a) said vehicular multi-camera vision system provides guidance when backing the equipped vehicle into a loading dock, (b) said vehicular multi-camera vision system provides guidance when backing the equipped vehicle with a trailer attached thereto, (c) said vehicular multi-camera vision system provides accident monitoring, (d) said vehicular multi-camera vision system is operable to alert the driver of the equipped vehicle to an impending rear-end collision and (e) said vehicular multi-camera vision system is operable to alert the driver of the equipped vehicle to an impending rear-end collision and to deploy a smart headrest in such an event.

77. The vehicular multi-camera vision system of claim 65, wherein said first field of view said first image capture device is bounded by the side of the equipped vehicle it is disposed at and extends outwards therefrom and wherein said second field of view said second image capture device is bounded by the side of the equipped vehicle it is disposed at and extends outwards therefrom.

78. A multi-camera vision system for a vehicle, said vehicular multi-camera vision system comprising:

at least three image capture devices disposed at a vehicle equipped with said vehicular multi-camera vision system;

said at least three image capture devices comprising a first image capture device disposed at a driver-side portion of the equipped vehicle at a first location;

said at least three image capture devices comprising a second image capture device disposed at a passenger-side portion of the equipped vehicle at a second location;

said at least three image capture devices comprising a third image capture device disposed at a rear portion of the equipped vehicle at a third location;

wherein said first image capture device has a first field of view exterior of the equipped vehicle;

wherein said second image capture device has a second field of view exterior of the equipped vehicle;

wherein said third image capture device has a third field of view exterior of the equipped vehicle;

wherein said first field of view of said first image capture device overlaps with said third field of view of said third image capture device defining a first overlap zone;

wherein said second field of view of said second image capture device overlaps with said third field of view of said third image capture device defining a second overlap zone;

wherein said first field of view said first image capture device is bounded by the side of the equipped vehicle it is disposed at and extends outwards therefrom and wherein said second field of view said second image capture device is bounded by the side of the equipped vehicle it is disposed at and extends outwards therefrom;

wherein said first image capture device captures first image data;

wherein said second image capture device captures second image data;

wherein said third image capture device captures second image data;

wherein each of said at least three image capture devices comprises a CMOS imaging array;

wherein said third vehicular camera disposed at the rear of the equipped vehicle is operable as a backup camera;

an image processor;

wherein first image data captured by said first image capture device is received at said image processor;

wherein second image data captured by said second image capture device is received at said image processor;

wherein third image data captured by said third image capture device is received at said image processor;

wherein, responsive to processing by said image processor of received image data, a synthesized image is generated without duplication of objects present in said first overlap zone and in said second overlap zone and wherein said synthesized image approximates a view as would be seen by a virtual camera at a single location exterior of the equipped vehicle;

wherein said synthesized image is displayed by a single display screen of a reconfigurable display device that is viewable by a driver of the equipped vehicle when normally operating the equipped vehicle;

wherein at least one of (a) first image data captured by said first image capture device is received at said image processor via a digital data stream and wherein second image data captured by said second image capture device is received at said image processor via a digital data stream and wherein third image data captured by said third image capture device is received at said image processor via a digital data stream and (b) image data transmission from said first, second and third image capture devices to said image processor is by electrically conductive leads over a vehicle communication bus; and wherein at least one of (a) said synthesized image displayed by said display screen approximates a panoramic view as would be viewed from a single virtual camera located exterior the equipped vehicle, (b) said synthesized image displayed by said display screen approximates a substantially seamless panoramic view as would be viewed from a single virtual camera located exterior the equipped vehicle and (c) said synthesized image displayed by said display screen approximates a substantially seamless view as would be viewed from a single virtual camera located exterior the equipped vehicle.

79. The vehicular multi-camera vision system of claim 78, wherein the image displayed by said display screen includes a visual indication of the location of the equipped vehicle in said view and wherein at least one of (a) said visual indication approximates the footprint occupied by the equipped vehicle and (b) wherein said visual indication comprises an outline of an area substantially occupied by the equipped vehicle.

80. The vehicular multi-camera vision system of claim 78, wherein said first image capture device is disposed at the equipped vehicle at substantially the same height relative to ground as is said second image capture device, and wherein said first location where said first image capture device is disposed at the driver-side of the equipped vehicle is a first distance forward of where the driver sits when operating the equipped vehicle and wherein said second location where said second image capture device is disposed at the passenger-side of the equipped vehicle is a second distance forward of where the driver sits when operating the equipped vehicle, and wherein said first distance is substantially the same as said second distance, and wherein said third image capture device is at a height relative to ground that is lower than the height relative to ground of said first and second image capture devices, and wherein said third location is a third distance rearward of where the driver sits when operating the equipped vehicle and wherein said third distance is larger than either of said first and second distances.

81. The vehicular multi-camera vision system of claim 78, wherein the image displayed by said display screen comprises a graphic overlay and wherein at least one of (i) said graphic overlay comprises indicia of the anticipated path of travel of the equipped vehicle and (ii) said graphic overlay comprises indicia indicating distance to objects exterior the equipped vehicle.

82. The vehicular multi-camera vision system of claim 78, wherein at least one of (a) the image displayed by said display screen comprises enhancements that assist visually distinguishing objects close to the equipped vehicle, (b) the image displayed by said display screen comprises indicia and wherein said indicia responds to at least one of the vehicle's steering system, the vehicle's differential system and a compass, (c) at least one of color and flashing is used to draw the driver's attention to a potential hazard present in the image displayed by said display screen and (d) the image displayed by said display screen comprises a graphic overlay that includes indicia of the anticipated path of travel of the equipped vehicle and wherein said graphic overlay is disabled when the vehicle's gear actuator is not in reverse gear.

83. The vehicular multi-camera vision system of claim 78, wherein at least one of (a) the display luminance of said display screen of said reconfigurable display device is variable responsive to a sensing of an ambient light level and (b) the display luminance of said display screen of said reconfigurable display device is variable responsive to at least one of (i) a vehicle headlight activation control, (ii) an ambient light sensor and (iii) an indication of ambient light level detected by at least one of said first, second and third image capture devices.

84. The vehicular multi-camera vision system of claim 78, wherein at least one of (a) said display screen of said reconfigurable display device is operable to display at least one of (i) pager information, (ii) a telephone number listing, (iii) global positioning system data, (iv) a map, (v) route guidance information, (vi) intelligent vehicle highway system information, (vii) a vehicle radio control setting, (viii) a vehicle environmental system setting, (ix) vehicle speed, (x) vehicle heading, (xi) turn signal indicators and (xii) a radio setting, (b) content displayed by said display screen of said reconfigurable display device is user-selectable, (c) content displayed by said display screen of said reconfigurable display device is user-selectable via at least one of a keypad and a trackball, (d) content displayed by said display screen of said reconfigurable display device is user-selectable via an input device located at a steering column of the equipped vehicle or at a dashboard of the equipped vehicle, (e) said reconfigurable display device comprises a flat-panel display device, (f) said reconfigurable display device comprises a flat-panel display device and wherein said flat-panel display device comprises a back-lit liquid crystal display device, (g) said reconfigurable display device comprises a flat-panel display device and wherein said flat-panel display device comprises a plasma display device, (h) said reconfigurable display device comprises a flat-panel display device and wherein said flat-panel display device comprises a light-emitting diode display device, (i) said reconfigurable display device comprises a flat-panel display device and wherein said flat-panel display device is mounted at a dashboard of the equipped vehicle and (j) said reconfigurable display device comprises a flat-panel display device and wherein said flat-panel display device is mounted at a facia of the equipped vehicle.

85. The vehicular multi-camera vision system of claim 78, wherein at least one of (a) each of said at least three image capture devices comprises an array of photosensing pixels and wherein a mosaic spectral filter masks incident radiation in order to produce pixels which respond respectively to red, green and blue light and (b) each of said at least three image capture devices comprises an array of photosensing pixels and comprises filtering to least one of (i) at least partially block near infrared radiation from pixels of said array and (ii) at least partially block infrared radiation from pixels of said array.

86. The vehicular multi-camera vision system of claim 78, wherein at least one of (a) said vehicular multi-camera vision system provides guidance when backing the equipped vehicle into a loading dock, (b) said vehicular multi-camera vision system provides guidance when backing the equipped vehicle with a trailer attached thereto, (c) said vehicular multi-camera vision system provides accident monitoring, (d) said vehicular multi-camera vision system is operable to alert the driver of the equipped vehicle to an impending rear-end collision and (e) said vehicular multi-camera vision system is operable to alert the driver of the equipped vehicle to an impending rear-end collision and to deploy a smart headrest in such an event.

* * * * *